United States Patent
Chari et al.

(10) Patent No.: US 9,812,033 B2
(45) Date of Patent: Nov. 7, 2017

(54) TACTILE GRAPHIC DISPLAY

(71) Applicant: Venkatesh R. Chari, North Andover, MA (US)

(72) Inventors: Venkatesh R. Chari, North Andover, MA (US); Randell Drane, Winchester, MA (US)

(73) Assignee: Venkatesh R. Chari, North Andover, MA (US)

( * ) Notice: Subject to any disclaimer, the term of this patent is extended or adjusted under 35 U.S.C. 154(b) by 85 days.

(21) Appl. No.: 14/850,393

(22) Filed: Sep. 10, 2015

(65) Prior Publication Data
US 2015/0379895 A1 Dec. 31, 2015

Related U.S. Application Data

(63) Continuation-in-part of application No. 13/799,300, filed on Mar. 13, 2013, now Pat. No. 9,142,143.
(Continued)

(51) Int. Cl.
*G09B 21/00* (2006.01)
(52) U.S. Cl.
CPC .................. *G09B 21/004* (2013.01)
(58) Field of Classification Search
CPC .... G09B 21/002; G09B 21/02; G09B 21/003; G09B 21/004; B41J 3/32
See application file for complete search history.

(56) References Cited

U.S. PATENT DOCUMENTS 4,178,586 A * 12/1979 Schonherr ............ G09B 21/001
340/407.1
5,453,012 A 9/1995 Hudecek
(Continued)

FOREIGN PATENT DOCUMENTS

| CN | 102176293 A | 9/2011 |
| CN | 102881252 A | 1/2013 |

(Continued)

OTHER PUBLICATIONS

Ottermo M. V., "Virtual Palpation Gripper," Department of Engineering Cybernetics, No. 7491, pp. 151, Jun. 1, 2006.
(Continued)

*Primary Examiner* — Timothy A Musselman
(74) *Attorney, Agent, or Firm* — Blueshift IP, LLC; Robert Plotkin

(57) ABSTRACT

A tactile graphic display for providing a display representation of a graph or image generated by a graphic device for visually impaired users or other users who wish to access tactile information. The display includes one or more frame assemblies including hollow actuator chambers and hollow shaft chambers, the hollow shaft chambers extending perpendicular to the hollow actuator members. Actuators are received within the plurality of hollow actuator chambers and drive shafts are received with the hollow shaft members. Cams operably connect the actuators to the drive shafts. Each actuator rotates each cam about an axis of the actuator in a first direction from a down position to an up position thereby extending each drive shaft upwardly, and each actuator operably rotates each cam about the axis of the actuator in a second direction opposite to the first direction to the down position thereby retracting each drive shaft downwardly.

17 Claims, 23 Drawing Sheets

Related U.S. Application Data

(60) Provisional application No. 61/773,671, filed on Mar. 6, 2013.

(56) References Cited

U.S. PATENT DOCUMENTS

| | | | |
|---|---|---|---|
| 5,717,423 | A | 2/1998 | Parker |
| 5,766,014 | A | 6/1998 | Ida |
| 5,772,440 | A | 6/1998 | Ida |
| 2008/0032160 | A1* | 2/2008 | Rosal ............... H01M 8/04208 429/508 |
| 2010/0159423 | A1 | 6/2010 | Hashizume |
| 2013/0017516 | A1* | 1/2013 | Tyler .................... G09B 21/004 434/114 |
| 2013/0149674 | A1* | 6/2013 | Anderson ............ G09B 21/004 434/114 |

FOREIGN PATENT DOCUMENTS

| | | |
|---|---|---|
| EP | 1429307 | 6/2005 |
| JP | 2005249935 | 9/2005 |
| KR | 1020110061858 | 6/2011 |
| KR | 20130001008 | 1/2013 |
| KR | 101281996 B1 | 7/2013 |
| WO | 2012120508 | 9/2012 |

OTHER PUBLICATIONS

Iwata H et al., "Project Feelex: Adding Haptic Surface to Graphics," Computer Graphics. Siggraph, pp. 469-475, Aug. 2001.

* cited by examiner

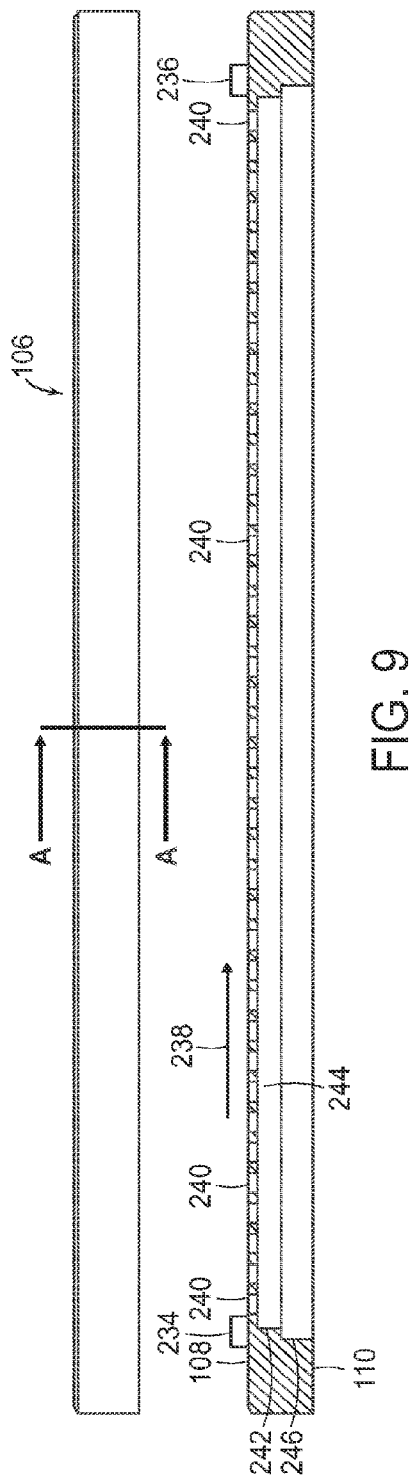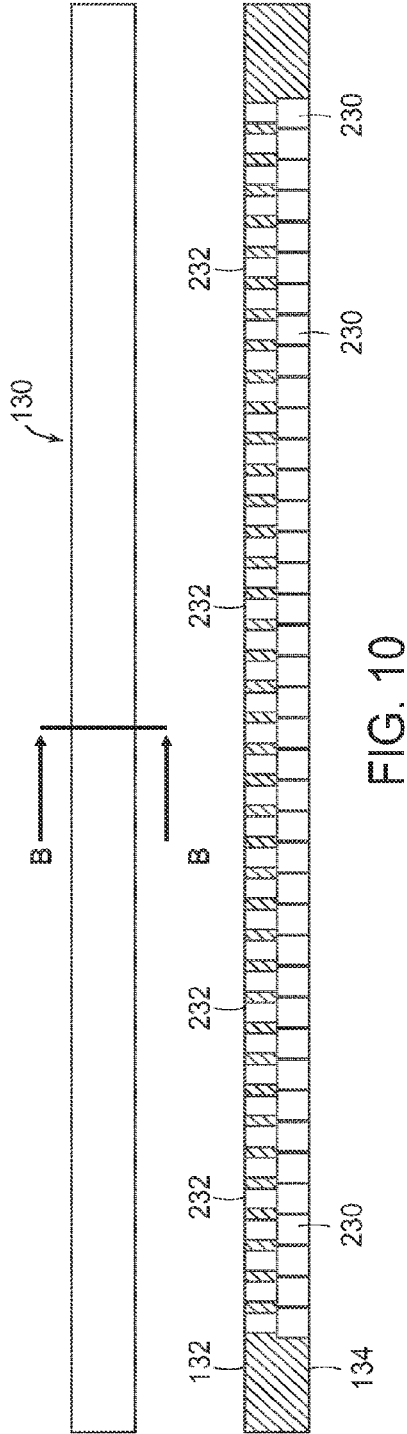

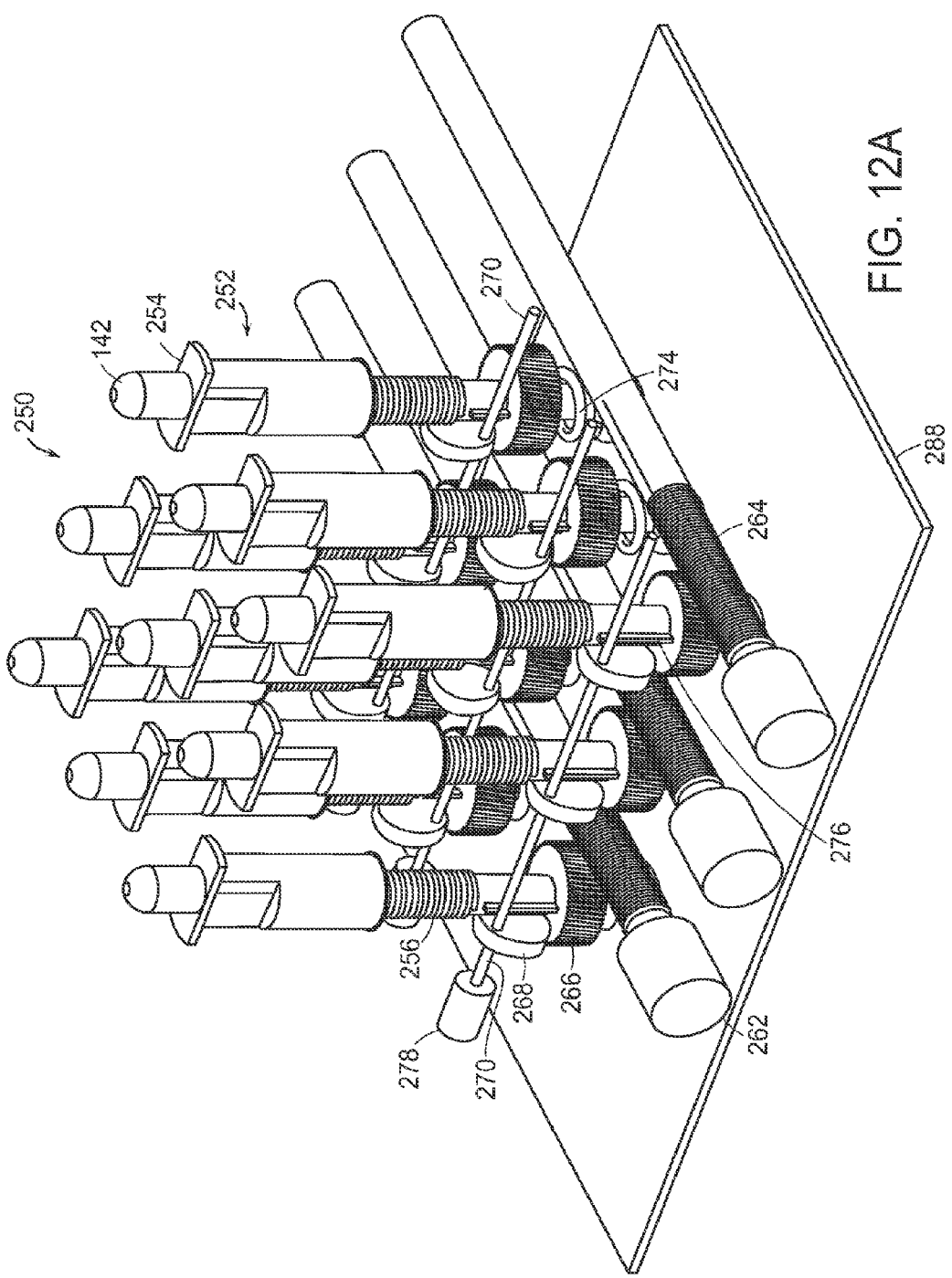

TACTILE GRAPHIC DISPLAY

CROSS REFERENCE TO RELATED APPLICATIONS

This application is a continuation-in-part of U.S. patent application Ser. No. 13/799,300, filed on Mar. 13, 2013, titled "TACTILE GRAPHIC DISPLAY", which in turn claims the benefit of U.S. Provisional Patent Application No. 61/773,671, filed on Mar. 6, 2013, titled "TACTILE GRAPHIC DISPLAY", the entire teachings of which are incorporated herein by reference.

FIELD

The invention relates generally to the field of tactile information devices for visually impaired users or other users who wish to access tactile information. In particular, the invention relates to the display of graphic information in a tactile manner.

BACKGROUND

Historically, systems have been developed to provide reading material based on raised dots that can be used by a blind or visually impaired person to obtain information, such as the Braille system that provides letters and numerals coded in the raised dots. Thus text originally composed in a visual manner, such as ordinary text using the English alphabet, is translated into the Braille system, so that the original English text can be understood by a visually impaired person. Traditionally, the raised dots are produced on a strip or page of paper by mechanical means, such as mechanical levers or other mechanisms that form impressions on the paper. Mechanical devices, such as a braille writer, have been developed that an operator can use to impress or, in effect, type the raised dots on the paper. Computer systems have been developed to allow an operator to type the characters into a computer, which are then converted into Braille, and a computer system mechanically produces the Braille text or produces printing plates or masters that can be used in printing Braille books or documents.

Modern systems have also been developed to display Braille and other information on a raised-dot display. Such a system uses some technique such as a mechanical approach to raise a dot (or bump) above a flat surface. The raised bumps form a Braille message or provide other information such as a graphic information. Various approaches for displays for visually impaired individuals have been developed or considered. These conventional approaches include shape memory alloys (SMA), electro-rheological fluids, solenoids, piezoelectric approaches, rotating disks, microfluidic valves, electroactive polymers, microstep motors, electrothermic actuators, electromagnetic microresonators, pneumatic microvalues, low melting point metal actuators, and RC (radio controlled) servomotors.

SUMMARY

According to one embodiment, a tactile graphic display for providing a display representation of a graph or image generated by a graphic device for visually impaired users or other users who wish to access tactile information is provided. The display includes one or more frame assemblies including hollow actuator chambers and hollow shaft chambers, the hollow shaft chambers extending perpendicular to the hollow actuator members. Actuators are received within the plurality of hollow actuator chambers and drive shafts are received with the hollow shaft members. Cams operably connect the actuators to the drive shafts. Each actuator rotates each cam about an axis of the actuator in a first direction from a down position to an up position thereby extending each drive shaft upwardly, and each actuator operably rotates each cam about the axis of the actuator in a second direction opposite to the first direction to the down position thereby retracting each drive shaft downwardly.

Other features and advantages of various aspects and embodiments of the present invention will become apparent from the following description and from the claims.

BRIEF DESCRIPTION OF THE DRAWINGS

The above and further advantages of embodiments of this invention may be better understood by referring to the following description in conjunction with the accompanying drawings, in which like numerals indicate like structural elements and features in various figures. The drawings are not necessarily to scale, emphasis instead being placed upon illustrating the principles of embodiments of the invention.

FIG. 9 is an illustration of a cross section view of a top panel, according to principles of the invention.

FIG. 10 is an illustration of a cross section view of a bottom panel, in accordance with principles of the invention.

FIG. 12A is an illustration of an isometric view of a cam and gear assembly for use with a dot matrix, in accordance with principles of the invention.

DETAILED DESCRIPTION

Figure 1A:
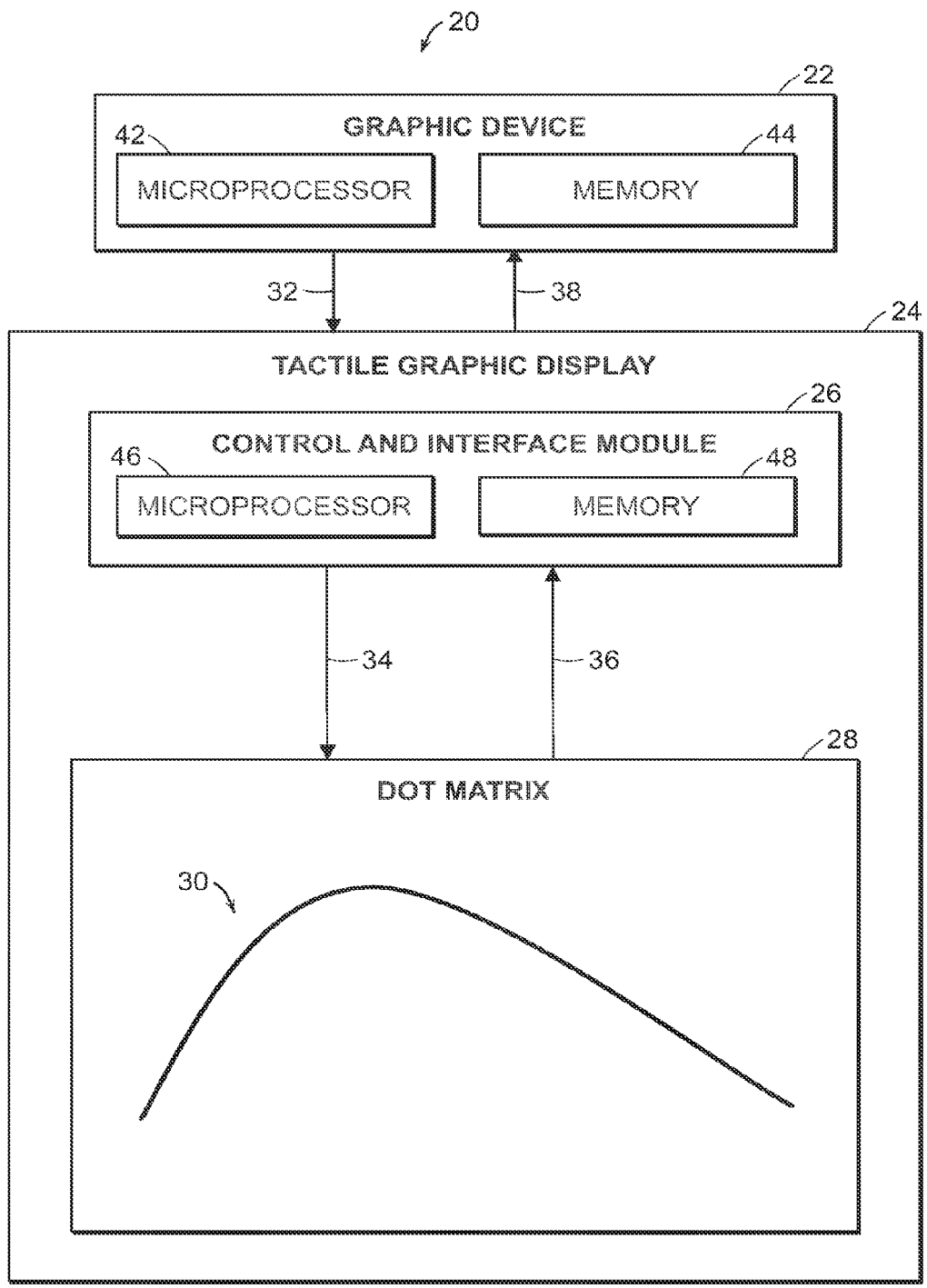
FIG. 1A is a schematic representation of a tactile graphic system, according to principles of the invention.

Reference will now be made in detail to exemplary embodiments of the present invention, examples of which are illustrated in the accompanying drawings, wherein like reference numerals refer to the like elements throughout. The exemplary embodiments are described below to explain the present invention by referring to the figures.

As used in the description of this application, the terms "a", "an" and "the" may refer to one or more than one of an element (e.g., item or act). Similarly, a particular quantity of an element may be described or shown while the actual quantity of the element may differ. For example, although four assemblies 136 are shown and described with respect to FIG. 3B, this is not intended to be limiting of the number of display assemblies in various embodiments of the invention. The terms "and" and "or" may be used in the conjunctive or disjunctive sense and will generally be understood to be equivalent to "and/or". References to "an" or "one" embodiment are not necessarily all referring to the same embodiment. Elements from an embodiment may be combined with elements of another. No element used in the description of this application should be construed as critical or essential to the invention unless explicitly described as such. Further, when an element is described as "connected," "coupled," or otherwise linked to another element, it may be directly linked to the other element, or intervening elements may be present.

The present invention has the advantage of providing nonstepping motors or actuators to actuate the raised dots in a dot matrix (or dot array) as a display representation (also termed a "tactile display" or "braille display") for the visually impaired or others who wish to access tactile information, for example, for nonvisual communication on the battlefield. The motors and actuators have minimal power requirements and the benefit of direct or other contact with a power source. In contrast to existing technologies (e.g., piezoelectric technology), the motors and actuators have the benefit of maintaining the raised dots in a lowered or raised position without the need for power to hold them in their position. In one embodiment, the motor is a vibrator motor of the type used in some mobile communication devices. In one embodiment, the motors are in direct contact with a PCB (printed circuit board) so that wiring or other connections for the motors are not required. In another embodiment, an actuator is connected to a drive shaft via a cam. A pin may be connected to the drive shaft.

In another embodiment, the present invention provides the advantages of a worm gear and cam system that produces raised dots on the dot matrix by the combined action of worm gears (for rows) and cam rods (for columns) to raise a dot at a particular row-column coordinate in the dot matrix. This approach has the advantage of using fewer motors, and of raising several dots at one time (along one row).

In one embodiment, each raised dot is a pin actuated by the motor by using a screw and thread arrangement that actuates movement by the pin in a vertical direction. In a further embodiment, one or more of the pins are depressed (typically by a user) and signals are generated that indicate which pins are depressed. In another embodiment, it is possible to sense the proximate presence of a finger, hand or other body part, even without the pins being depressed, just as would occur on a touch screen or touch pad. Thus, on a dot matrix, an image (e.g., line or graph) is produced for sensing by a visually impaired user, and the user produces an impression on the dot matrix (e.g., line or graph) by moving a finger (or stylus or other device) over the matrix to depress selected pins, which serve as tactile input to the matrix. This tactile input (whether actual touching occurs or not) can be communicated to a software application operating on a computer, which performs various functions, such as recording and responding to the tactile input.

In another embodiment, the present invention provides the advantages of an actuator and cam system to actuate linear movement. Although the actuator and cam system is described with respect to a tactile graphic display system including pins on a dot matrix, the embodiments are exemplary and other applications requiring actuators to actuate linear movement are considered to be within the scope of the present invention. Other advantages provided by an embodiment of a tactile graphic display may include that the display is lightweight, easy to service, and fluid-dust-temperature resistant.

Figure 1B:
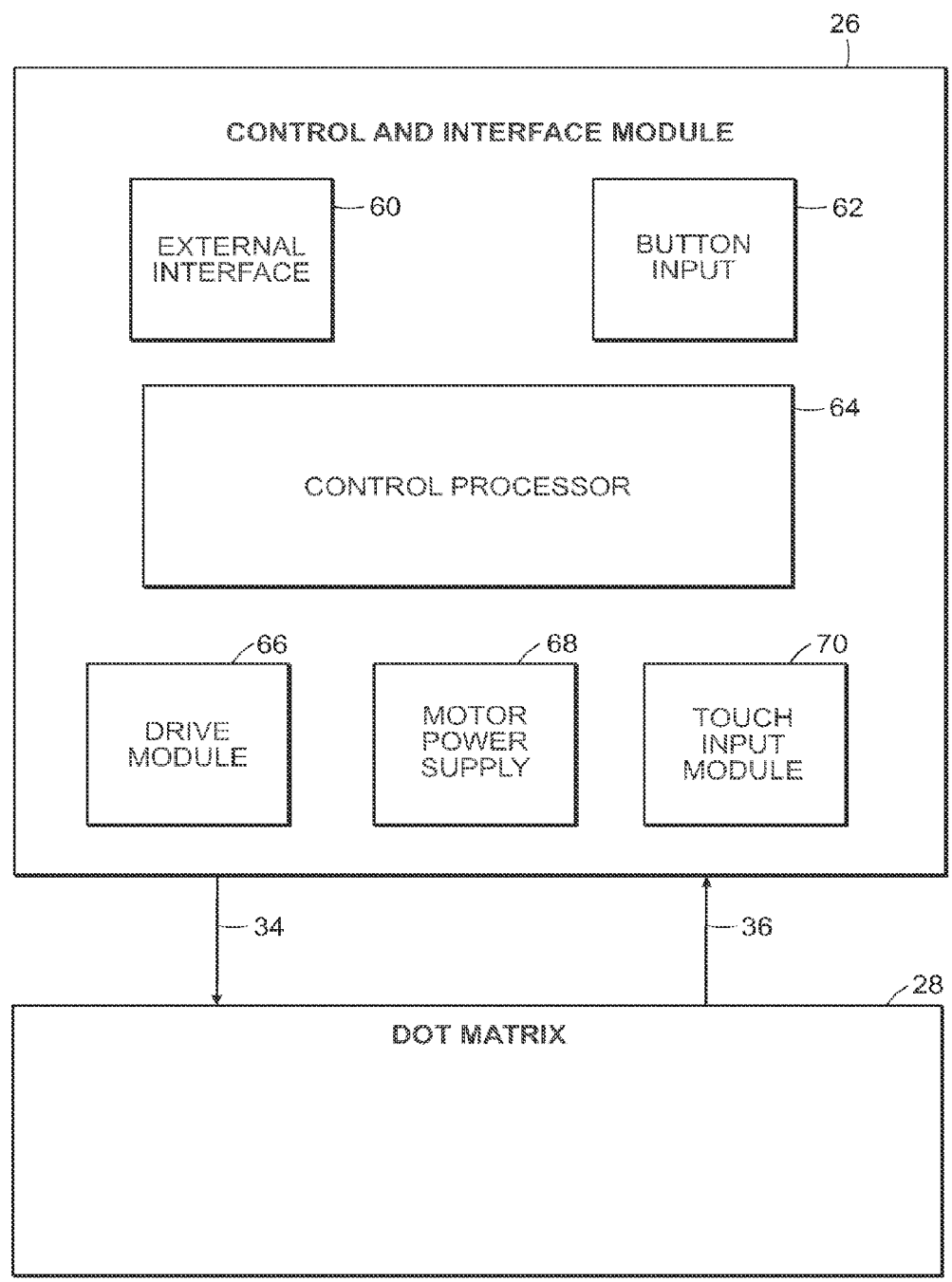
FIG. 1B is a schematic representation of a control and interface module, in accordance with the principles of the invention.

FIG. 1A depicts a schematic representation of a tactile graphic system 20, in accordance with principles of the invention. The tactile graphic system 20 includes a graphic device 22 and a tactile graphic display 24. The tactile graphic display 24 includes a control and interface module 26 and a dot matrix 28, which provides a display representation 30 of raised dots 82 (see FIG. 2). The graphic device 22 includes a microprocessor 42 and memory 44. The control and interface module 26 includes a microprocessor 46 and memory 48. FIG. 1A depicts signals, including graphic output signals 32, motor or actuator drive signals 34, dot matrix engagement signals 36, and tactile input signals 38. The dot matrix engagement signals 36, in one embodiment, include movements of a finger, hand, or other body part near the dot matrix 28 without actual touching occurring. FIG. 1B is a schematic representation of a control and interface module 26, in accordance with principles of the invention. The control and interface module 26 includes an external interface 60, a button input module 62, a control processor 64, a drive module 66, a motor or actuator power supply 68, and a touch input module 70. In one embodiment, the control and interface module 26 is implemented as a PCB that includes a digital microprocessor 46 and a memory 48. In other embodiments, the control and interface module 26 has one or more digital microprocessors 46 and one or more memories 48.

Figure 2:
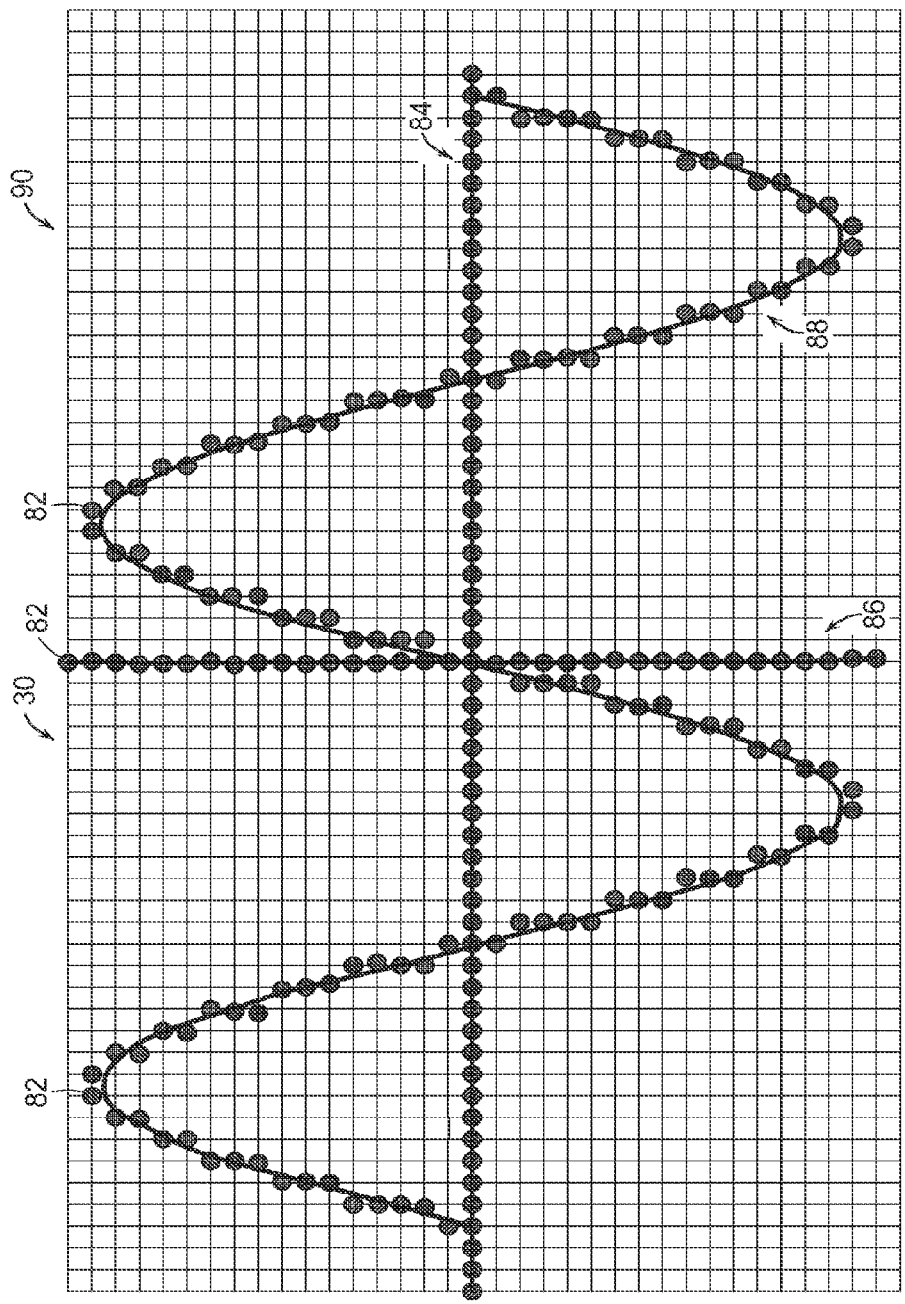
FIG. 2 is a schematic representation of a dot matrix showing a display representation, in accordance with the principles of the invention.

FIG. 2 depicts a display representation 30, providing a tactile representation of a display for a visually impaired person or others who wish to access tactile information, according to principles of the invention. The display representation 30 is composed of dots 82 on the dot matrix 28. Generally, dots 82 typically have rounded concave surfaces and are capable of being moved above the surface of the dot matrix 28. The dots 82, in various embodiments, are made of various materials, including plastic or metal. The dots 82 have more specific embodiments, including the rounded tip 115 (see FIG. 3A) and the pin cap 142 (see FIG. 4A). The dots 82 are raised to form the display representation 30 that can be sensed by touch. The display representation 30 includes an X axis 84 and a Y axis 86, in the example shown in FIG. 2. In this example, the display representation 30 provides a sine wave 88. FIG. 2 also depicts a grid 90, which is aligned with an array of dots 82, some raised, other dots 82 are not raised (not shown in FIG. 2). In one embodiment, a dot 82 is placed at each intersection of lines in the grid 90 to form the array of dots 82 for the dot matrix 28 (for example, 40 by 60). In various embodiments, the grid 90 itself is not required to be displayed or presented.

In various embodiments, the graphic device 22 is a graphic calculator, a desktop computer, a laptop computer, a mobile telephone, a pad or tablet computing device, or other suitable digital computing device. The graphic device 22 includes a digital microprocessor 42 and a memory 44. The memory 44 includes a volatile memory (e.g., random access memory or RAM), and/or a nonvolatile memory (e.g., disk or nonvolatile memory IC (integrated circuit) chip). Instructions for the graphic software are stored in the memory 44. The graphic software is any kind of software that produces a graph, image, text communication (e.g., Braille) or other output for a display representation 30 on a dot matrix 28. The instructions of the graphic software program the digital microprocessor 42 to perform the functions of the graphic software as described herein. In one embodiment, the tactile graphic system 20 provides for output only, and the dot matrix 28 provides raised dots 82 for reading or sensing by the user. In another embodiment, the tactile graphic system 20 also receives and processes input from the dot matrix 28 when tactile input is provided. For example, a proximity sensor 126 (also termed a "touch sensor", see FIG. 3B) senses that tactile pressure is applied to the raised dots 82 and/or the proximate presence of fingers, hand or other body part near the dots 82. In one embodiment, the graphic software includes output modification software that adapts the output of the graphic software to produce the output signals 32 suitable for input to the control and interface module 26.

The control and interface module 26 receives the output signals 32 from the graphic device 22 and processes the output signals 32 to produce motor or actuator drive signals 34 that are output to the drive motors 120 (see FIG. 3A) or actuators 424 (see FIG. 15) that actuate the dot matrix 28. In one embodiment, the control and interface module 26 is implemented as a PCB that includes a memory 48, and one or more digital microprocessors 46. In one embodiment, the tactile graphic display 24 operates in a standalone approach, wherein stored data from the memory 48 is displayed as the display representation 30 on the dot matrix 28 and touch and/or proximity inputs are stored in the memory 48. In a further embodiment, multiple devices (tactile graphic displays 24 or including tactile graphic displays 24) are in communication with one another, and a graphic created on one is transmitted to and displayed on the others.

The external interface 60 receives as input the output signals 32 from the graphic device 22 and provides as output tactile input signals 38 to be sent to the graphic device 22 when dot matrix engagement signals 36 (for example, pressing of one or more dots 82 and/or the proximate presence of a finger, hand, or other body part, or stylus in proximity to the dot matrix 28) has been received at the dot matrix 28. In another embodiment, the data sent to the graphic device 22 contains information related to the position of the fingers (hand or other body part) on the dot matrix 28, which may be sensed by touch, by pressing of the dots 82, or proximity to the dot matrix 28.

The button input module 62 receives input from a set of buttons associated with the tactile graphic display 24. For example, one button resets the dot matrix 28, so that no dots 82 are raised, in effect erasing whatever output that was displayed in a display representation 30 by the dot matrix 28. In another example, pressing one or more specific buttons causes the graph or image in the display representation 30 to zoom in or out (that is, be enlarged, or be reduced). Other actions include panning and rotation. In alternate embodiments, the buttons (or other means of input) are provided on the top of a tactile display case 502 (see FIG. 16), or on one side of the display case 502, or in a separate case or box that is in communication with the button input module.

The touch input module 70 receives dot matrix engagement signals 36, which are, in various embodiments, touch sensing signals from the dot matrix 28 and/or proximity sensing signals that sense the proximate presence of a finger, hand, or other body part to the dot matrix 28 (without touching or pin movement). The touch input module 70 processes these dot matrix engagement signals 36. The touch input module 70 produces tactile input signals 38 that are sent to the graphic device 22. In one embodiment, a visual representation corresponding to the input signals 38 is presented on a display screen associated with the graphic device 22.

The drive module 66 provides motor or actuator drive signals 34 to the drive motors 120 or actuators 424 associated with the dot matrix 28, which actuate specific drive motors 120 or actuators to raise specific dots 82 to form an output (e.g., image, graph, Braille, or other output) that is displayed as a display representation 30 on the dot matrix 28. The motor or actuator power supply 68 provides the power for the drive motors 120 or actuators 424.

The control processor 64 controls the processes of the control and interface module 26. In one embodiment, the control processor 64 is a digital microprocessor 46 with access to a memory 48. The memory 48 includes a volatile memory (e.g., random access memory or RAM), and/or a nonvolatile memory (e.g., disk or nonvolatile memory IC (integrated circuit) chip). Instructions for the control software of the control processor 64 are stored in the memory 48. The instructions of the control software program the digital microprocessor 46 to perform the functions of the control and interface module 26 as described herein. In various embodiments, all or some of the various modules of the control and interface module 26 are implemented as separate digital microprocessors, microchips, logic chips, and/or other suitable chips, modules, or submodules.

Figure 3A:
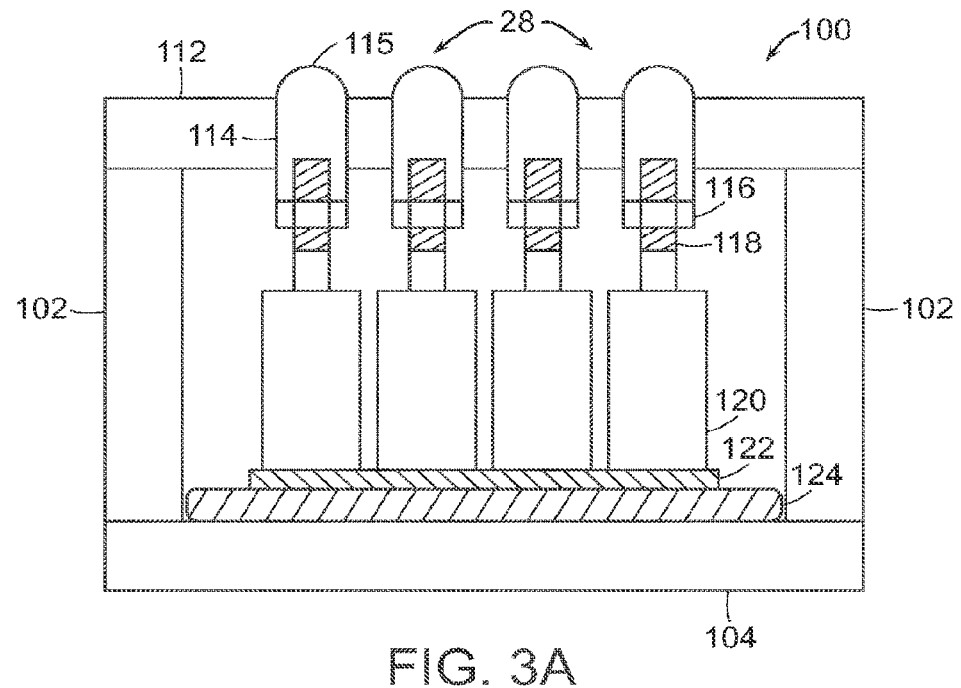
FIG. 3A is an illustration of a side view of a tactile display case for a tactile graphic system, according to principles of the invention.
Figure 3B:
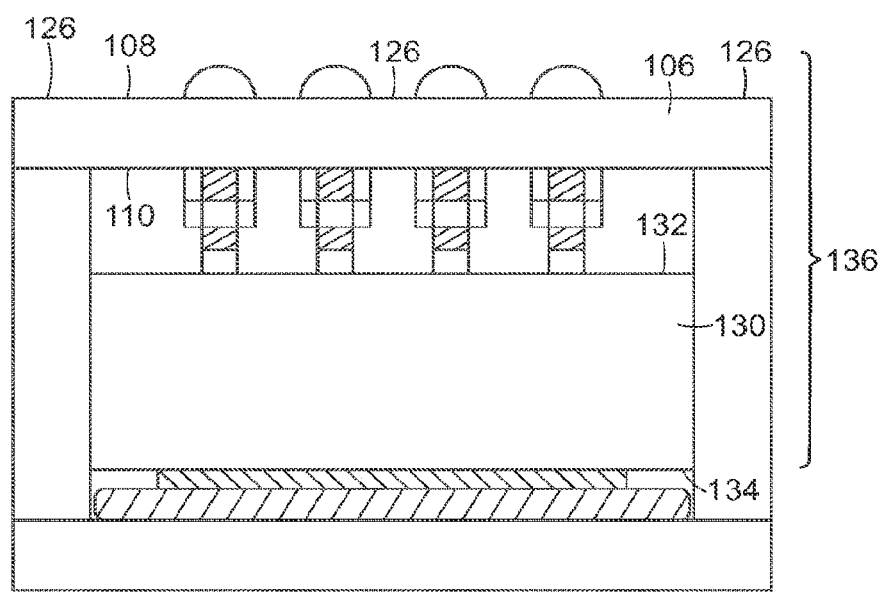
FIG. 3B is an illustration of a side view of the tactile display case of FIG. 3A, including a top panel and bottom panel, according to principles of the invention.

FIG. 3A is side view of a tactile display case 100 for a tactile graphic display 24, according to principles of the invention. The display case 100 is formed from side portions 102 and a bottom portion 104. FIG. 3A also depicts hollow pins 114 having rounded tips 115, base nut 116, screw 118, a drive motor 120, electrical contacts 122, and a printed circuit board 124. In one embodiment, the base nut 116 is incorporated into a pin nut 144. FIG. 3B is side view of the tactile display case 100 of FIG. 3A further including a top panel 106 and bottom panel 130. The top panel 106 has a top surface 108 and a bottom surface 110. The bottom panel 130 has a top surface 132 and a bottom surface 134. The display assembly 136 generally includes the dot matrix 28 and dots 82, top panel 106, bottom panel 130, and the mechanism needed to support and raise the dots 82. For the example shown in FIGS. 3A and 3B, the display assembly 136 includes the bottom panel 130, drive motors 120, screw 118, hollow pins 114, base nut 116, and top panel 106. In one embodiment as shown in FIG. 3B, the top panel 106 extends to cover the top of the side portions, 102. In other embodiments, the top panel 106 does not cover the top of the side portions, 102 which are extended to the same height as the top surface 108 of the top panel 106. In the example depicted in FIGS. 3A and 3B, four display assemblies 136 are shown, which is not intended to be limiting of the number of display assemblies 136 in various embodiments of the invention.

In one embodiment, the PCB 124 and dot matrix 28 are in the same tactile display case 100 (e.g., rectangular box). The display case 100, in various embodiments, is any suitable size or shape. In one embodiment, the display case 100 has an oblong shape (generally like a book) and is positioned horizontally with the dot matrix 28 forming all or part of the top of the display case 100. The display case 100 thus provides a horizontal tactile graphic display 24 for use by a visually impaired user, who orients the display case 100 as though reading a book (e.g., Braille book) with the dot matrix 28 made available for tactile contact and/or proximity contact by the user. The PCB 124 is below the dot matrix 28.

In various embodiments, the tactile display case 100 has any suitable orientation, such as taking an orientation similar to a computer monitor; that is, where the dot matrix 28 has a vertical orientation. In various orientations of the display case 100, the terms "top" and "bottom" for the display case 100 should be changed accordingly, to correspond to the orientation, such as to "front" and "back." The terms "proximal" and "distal" are also used. Thus, the dot matrix 28 surface or side of the display case is termed the proximal surface or side, because it is proximal (next to or near) to the source of the tactile and/or proximity contact, such as the proximate presence of a finger, hand, stylus, or other device. The opposite side or surface of the display case 100 is termed the distal side or surface, because it is remote or far from the tactile contact. The use of the terms "top" and "bottom" is not meant to be limiting of the orientation of the invention. For the sake of the discussion herein, generally, the terms "top" and "bottom" are used, with the understanding that these terms are equivalent to other terms such as "front" and "back" or "proximal" and "distal" depending on the orientation of the display case 100. Similarly, the terms "front" and "back" and "proximal" and "distal" are used with the understanding that these terms are equivalent to other terms such as "top" and bottom".

In one embodiment, the tactile display case 100 has a top portion 112 (for example, top panel 106), a bottom portion 104, and a plurality of side portions 102 so that the top portion, bottom portion 104, and side portions 102 form an enclosed space. The display case 100, in one embodiment, has the control and interface module 26 mounted or positioned in the bottom or distal part of the display case 100, and the dot matrix 28 is mounted or positioned in the top or proximal part of the display case 100. The top portion 112 of the display case 100 includes the dot matrix 28, providing the raised dots 82 that are accessed in a tactile manner or by proximity by a visually impaired person so that the displayed output (e.g., display representation 30) is sensed and understood.

The tactile display case 100, in one embodiment, includes the top panel 106 and the bottom panel 130. The bottom panel 130 holds the drive motors 120. Each drive motor 120 is oriented so that the bottom part of the drive motor 120 has electrical contacts 122. When the bottom panel 130 is mounted or positioned in the display case 100, the bottom panel 130 is positioned directly above the control and interface module 26. In one embodiment, the electrical contacts 122 of each drive motor 120 are in direct contact (electrical communication) with the top surface of the PCB 124, which includes the components of the control and interface module 26. Thus the motor or actuator drive signals 34 produced by the control and interface module 26 are communicated through the PCB 124 to the electrical contacts 122 of the drive motors 120, without need for wiring, radio, or other communications or contact.

The dot matrix 28, in various embodiments, is any suitable shape. In one embodiment, the dot matrix 28 has a rectangular shape of 40 dots by 60 dots, forming an array of 2400 dots. The spacing between dots 82, in one embodiment, is about four millimeters. The spacing between dots 82, in another embodiment, is closer than four millimeters. In a further embodiment, the spacing between dots 82 is about two millimeters. To accomplish a larger array with the smaller spacing, in one embodiment the drive motors 120 are staggered (that is, alternate drive motors 120 are placed in a bottom panel 130 at different vertical distances from the top surface 108 of the top panel 106). In an alternate embodiment, smaller drive motors 120 are required to allow for a more closely spaced array of dots 82 in the dot matrix 28.

In one embodiment, the drive motor 120 is a vibrator motor of the type used in some mobile communication devices that provides a vibration rather than a ring or other sound to alert a user to an incoming call. In this case, the vibrating attachment, typically a lopsided weight connected to the drive shaft 176 of the drive motor 120, is not included. In one embodiment, the motor drive signals 34 provide a specific pulse of power with an expectation that the motor 120 rotates an expected number of degrees, so that for a given pulse a dot 82 is driven by a motor 120 to move vertically to extend above the top surface 108 of the top panel 106 a predetermined distance. In various embodiments, mechanisms are used to prevent further rotation than desired (antirotation mechanisms). In various embodiments, the drive motor 120 is a brushless or brushed DC motor of a suitable size. The drive motors 120 are arranged in an array corresponding to the array of dots 82 in the dot matrix 28, and the motor drive signals 34 generated by the control and interface module 26 are directed to specific motors 120 in the array in order to raise the specific dots 82.

The top panel 106 provides openings. The openings, in one embodiment, are in the shape of cylinders. In one embodiment, the top panel 106 and bottom panel 130 are aligned and mounted or positioned together the locations of the cylinders of the top panel 106 align axially with the cylinders of the bottom panel 130.

In one embodiment, proximity sensors 126 are included, which sense touching one or more dots 82 of a dot matrix 28 and/or the proximate presence of a finger, hand, or body part to the top panel 106. The proximity sensors 126, in one embodiment, are an array of electrical sensors provided in the top panel 106; for example, at the top surface 108. The sensors 126 determine a movement of a finger (or stylus or other device) that results in a pressing down of one or more dots or proximate presence of a finger, hand, or other body part. The array of sensors 126 thus determines the location of a movement relative to the dot matrix 28. The sensors 126, in another embodiment, also sense a movement that is just above the dot matrix 28, without actually depressing any dots 82. Thus, for example, a wiping motion by fingers across the dot matrix 28 without touching any dots 82 erases the current image displayed on the dot matrix 28.

In various embodiments, other approaches are used that enable the sensing of a finger, multiple fingers, a stylus, or other devices above the dot matrix 28 (without actual touching) and/or at one or more dots 82 of the dot matrix 28 when causing depression or of one or more dots 82. One such approach is an optical approach, discussed elsewhere herein.

Figure 4B:
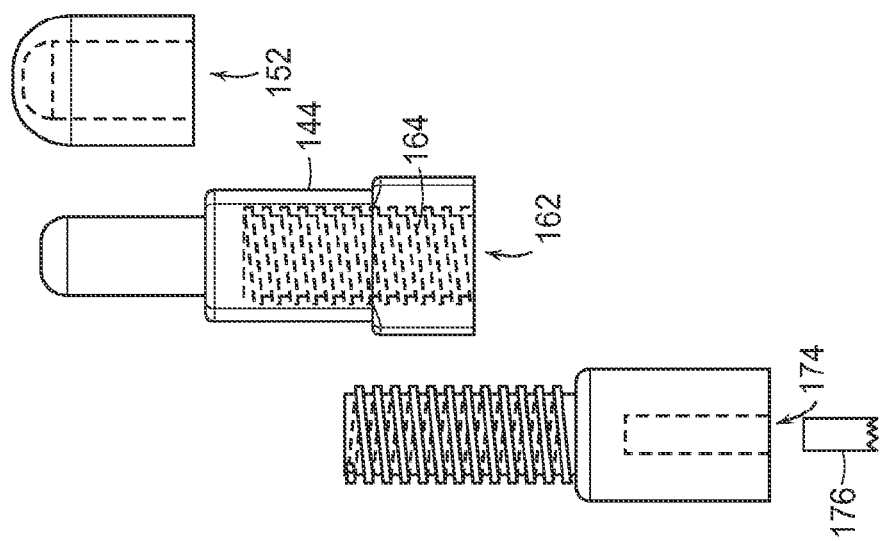
FIG. 4B is an illustration of an exploded side view of the drive pin assembly of FIG. 4A showing a threaded cavity in a pin nut, in accordance with principles of the invention.
Figure 4A:
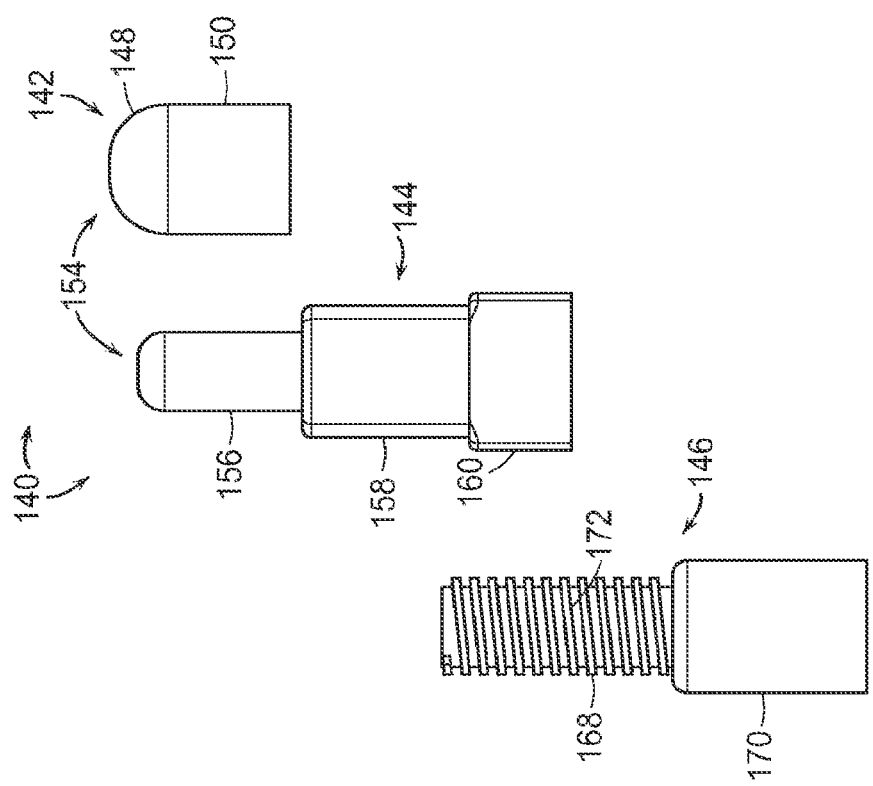
FIG. 4A is an illustration of an exploded side view of a drive pin assembly, in accordance with principles of the invention.

FIG. 4A is an exploded side view of a drive pin assembly 140, in accordance with principles of the invention. FIG. 4B is an exploded side view of the drive pin assembly of FIG. 4A showing a threaded cavity 162 in a pin nut 144, in accordance with principles of the invention. The drive pin assembly 140 includes a cap 142, pin nut 144, and lead screw 146. In one embodiment, the lead screw 146 is equivalent to the lead screw 118. The cap 142 includes a top portion 148, a bottom portion 150, and a cavity 152. A pin nut assembly 154 includes the cap 142 and the pin nut 144. In other embodiments, the pin nut assembly 154 includes a dot 82 and a pin nut 144, indicating that various kinds of dots 82 are capable of being attached to a pin nut 144. In the embodiment shown in FIGS. 4A and 4B, the pin nut 144 includes a connecting protrusion 156, a central part 158, a base part 160, and a threaded cavity 162 that is threaded with female threads 164. The lead screw 146 includes a threaded portion 168 and a base portion 170. The threaded portion 168 is threaded with male threads 172. In one embodiment, the base portion 170 of the lead screw 146 includes a drive shaft cavity 174 for connection to a drive shaft 176 of a drive motor 120. In one embodiment, the display assembly 136 includes the bottom panel 130, drive motor 120 with drive shaft 176, the drive pin assembly 140, and the top panel 106.

In one embodiment, each drive shaft 176 connects to a lead screw 146 at the top end of each drive shaft 176. Each lead screw 146 forms male threads 172 and connects to a pin nut 144. Each drive pin assembly 140 includes from bottom to top a lead screw 146, a pin nut 144, and cap 142, all of which are axially aligned. Each pin nut 144 has a cylindrical inner wall, axially aligned with the pin nut 144 that forms female threads 164 that correspond to the shape and thread pitch of the lead screw 146 attached to each drive shaft 176.

Each pin nut 144 and cap 142 are fastened together to form one pin nut assembly 154. In one embodiment, the cap 142 forms a cavity 152 axially aligned with the pin nut 144. The pin nut 144 has a connecting protrusion 156 at the top of the pin nut 144, which is axially aligned with the pin nut 144. The connecting protrusion 156 of the pin nut 144 is sized to match the cavity 152 of the cap 142, and is inserted into the cavity 152 to fasten the cap 142 to the pin nut 144. In other embodiments, other forms of fastening are used.

Figure 5:
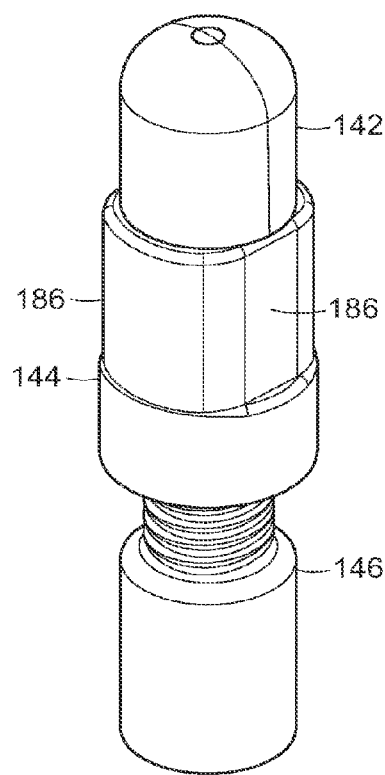
FIG. 5 is an illustration of an isometric view of the drive pin assembly of FIGS. 4A and 4B, according to principles of the invention.

FIG. 5 is an isometric view of the drive pin assembly 140 of FIGS. 4A and 4B, according to principles of the invention. FIG. 5 depicts parallel planar surfaces 186 of the pin nut 144. In FIG. 5 one pin nut planar surface 186 is shown in the isometric view, and another pin nut planar surface 186 is located opposite and parallel to the first pin nut planar surface 186.

As a pin nut assembly 154 is moved vertically, the top part of the pin nut assembly 154 encounters a locking, or antirotation mechanism that prevents rotation of the pin nut assembly 154. Rotation of the motor 120 is stopped either by a closed loop feedback mechanism in the control circuit or when the top surface of the pin nut 144 comes in contact with the top panel 106 and cannot move any further. Thus, the upper part of the pin nut assembly 154 is prevented from extending too far above the top surface 108 of the top panel 106. In one embodiment, the antirotation mechanism provides for a connection between a pin nut assembly 154 and the top panel 106. The parallel planar surfaces 186 of each pin nut 144 engage with corresponding parallel planar surfaces 244 provided in the top panel 106 as each pin nut 144 moves vertically into a corresponding opening in the top panel 106. The engagement of the pin nut planar surfaces 186 with the corresponding top panel planar surfaces 244 provide the antirotation effect.

Figure 6:
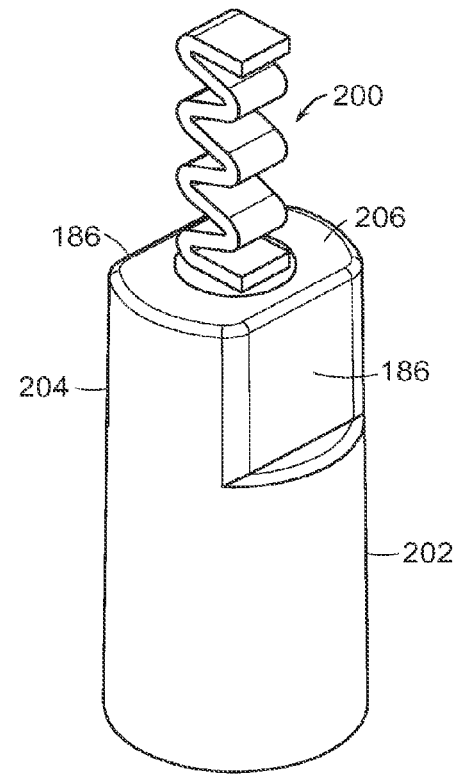
FIG. 6 is an illustration of an isometric view of a spring mechanism for use with a modified pin nut, according to principles of the invention.

FIG. 6 depicts an isometric view of a spring mechanism 200 for use with a modified pin nut 202, according to principles of the invention. The spring mechanism 200 is attached to a top surface 206 of an upper portion 204 of the modified pin nut 202.

The pin nut assembly 154 includes a spring mechanism 200, so that a certain (limited) amount of pressure applied to the cap 142 does not cause the pin nut assembly 154 to become depressed, such as by casual touching or just grazing a cap 142 that has been raised. In one embodiment, the spring mechanism 200 is attached to the top of the pin nut 144. The spring mechanism 200 at the top of the pin nut 144 fits into the cap 142, which has a cavity 152 sized and shaped to receive the spring mechanism 200. The spring mechanism 200 is implemented in various embodiments, such as a coiled spring, a spiral spring, an angular (or saw-tooth) shaped piece of flexible material, or other suitable spring-like mechanism.

Figure 7:
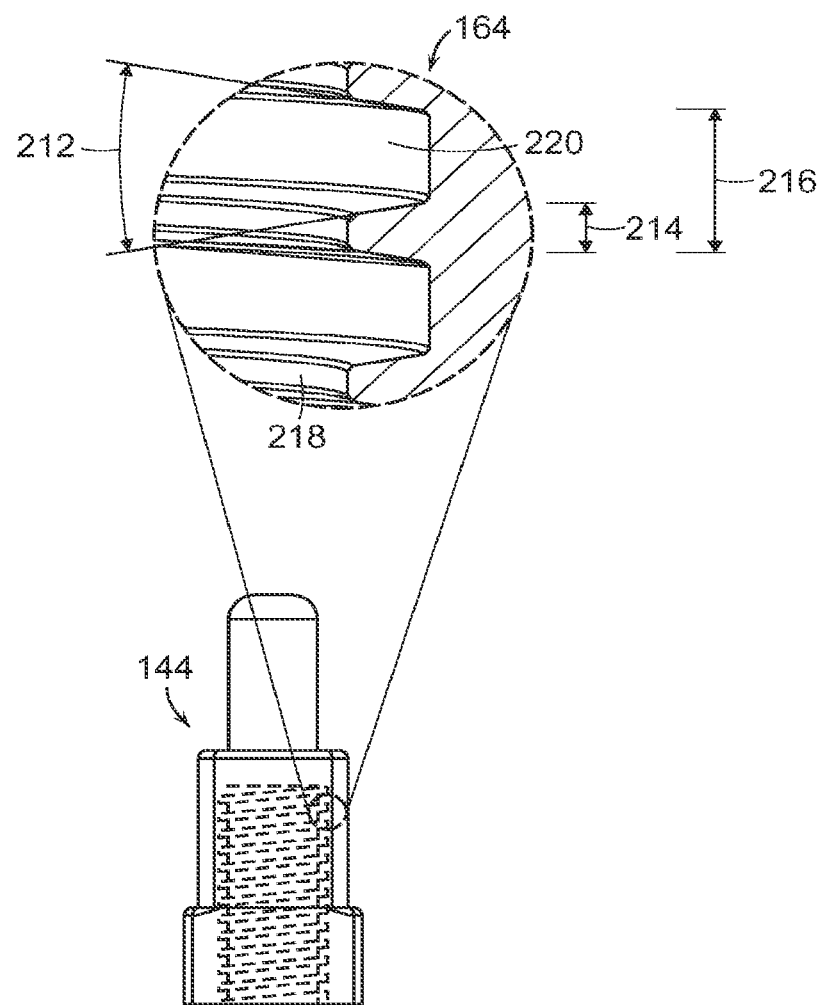
FIG. 7 is an illustration of a side view of female threads in a threaded cavity of a pin nut, in accordance with principles of the invention.
Figure 8:
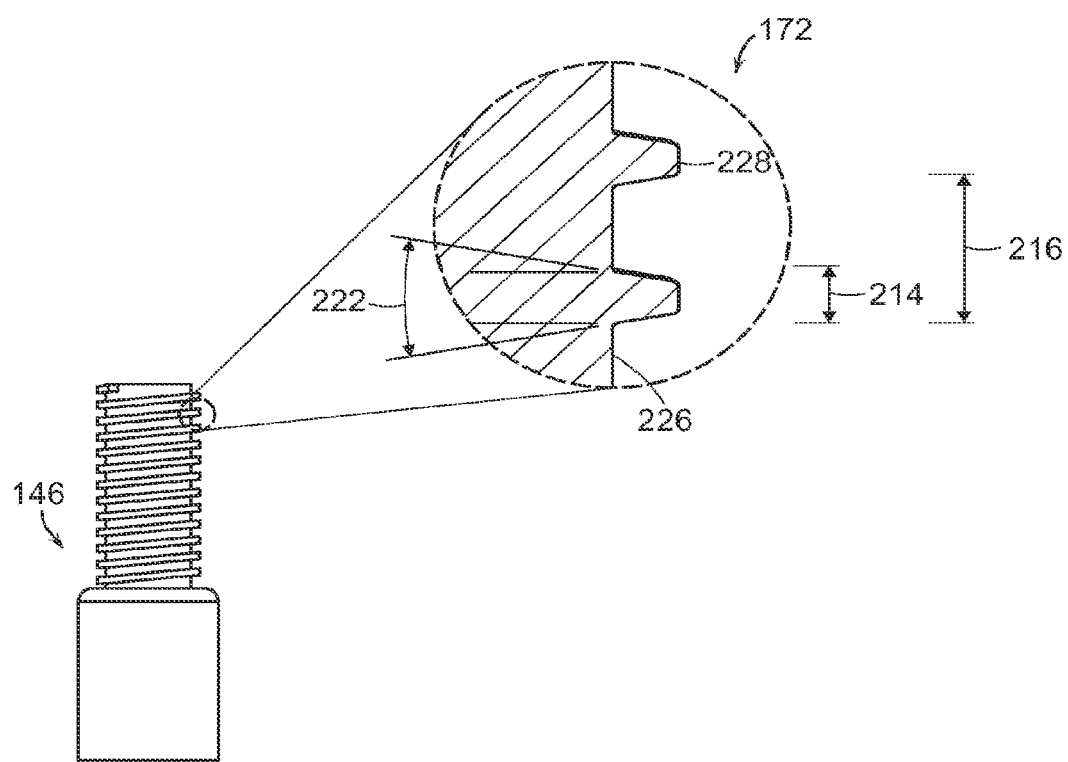
FIG. 8 is an illustration of a side view of male threads of a lead screw, according to principles of the invention.

FIG. 7 is a side view of female threads 164 of a pin nut 144, in accordance with principles of the invention. The female threads 164 are based on a female thread angle 212, a profile 214, and a pitch 216. The female threads 164 have a protruding surface 218 and a recessed surface 220. FIG. 8 is a side view of male threads 172 of a lead screw 146, according to principles of the invention. The male threads 172 are based on a male thread angle 222, a profile 214, and a pitch 216. The male threads 172 have a protruding surface 228 and a recessed surface 226.

In one embodiment, the thread angle 222 for the male threads 172 and thread angle 212 for the female threads 164 is about 20 degrees. In various embodiments, the thread angles 222, 212 vary from 10 degrees to 30 degrees. In further embodiments, the thread angles 222, 212 are in a more extended range.

The threads 164, 172 are designed to provide low-to-moderate friction necessary for power transfer to move the pin nut assembly 154 smoothly in a vertical direction. The design of the threads 164, 172 allows for vertical movement of the pin nut assembly 154 without seizing or locking up, rather than a thread design that is intended to lock the male threads 172 and female threads 164 at a certain point. In addition, the threads 164, 172 are designed to avoid a back drive by the lead screw 146; that is, convert a linear push by the user into rotary motion in the lead screw 146. Thus when a drive motor 120 is provided power to rotate (by a motor drive signal 34) the pin nut assembly 154 moves vertically to extend the top part of the pin nut assembly 154 above the top surface 108 of the top panel 106, thus providing a raised dot 82 in the dot matrix 28.

The thread shape of male threads 172 has a trapezoidal shape for the protruding surface 228, and the female threads 164 have a corresponding trapezoidal shape. In one embodiment, space is provided between the male threads 172 and the female threads 164, which is about 20 percent of the pitch 216, which is slightly larger or smaller in various embodiments.

FIG. 9 is a cross section view of a top panel 106, according to principles of the invention. FIG. 9 is not necessarily drawn to scale. The top panel 106 has a top surface 108 and a bottom surface 110. The top panel 106 includes cylindrical holes 240 in the top surface 108 of the panel 106. The top panel 106 also includes longitudinal slots 242 adjacent to the holes 240. The slots 242 provide parallel planar surfaces 244. Adjacent to the slots 242 and below them is a lower opening 246 that is sized to allow free motion of the pin nut assembly 154.

In various embodiments, input by a user (e.g., pressing of dots 82 on the dot matrix or proximate presence of a finger, hand, or other body part) is sensed by an optical approach using optical elements 234, 236. In one embodiment, a line (e.g., column) of source optical elements 234 which are lighting sources (LED's or other sources) is aligned with one edge of the dot matrix 28, such as a vertical edge of a rectangular dot matrix 28. Rays of light 238 shine across the dot matrix 28 just above the caps 142. A line (e.g., column) of receiving optical elements 236 that are light sensors is positioned on the opposite side of the dot matrix 28 for receiving the rays of light 238 coming from the lighting sources 234, such as on the vertical edge opposite of the light sources 234. When a user interrupts the light ray 238 (e.g. by movement of a finger, stylus, or other device) the position of the movement is determined. A similar approach is used for the horizontal edges of the dot matrix 28. Thus a movement depressing pin caps 142 is recorded to indicate a vertical and horizontal position of the movement, which is provided as dot matrix engagement signals 36 to the control and interface module 26.

In various other embodiments, input by a user (e.g., pressing of dots 82 on the dot matrix or proximate presence of a finger, hand, or other body part) is sensed by a capacitive approach. In one embodiment, a transparent conductor coats the top surface 108. The transparent conductor senses the presence and degree of a touch on the top surface 108. In another embodiment, a transparent conductor coats a touchable surface of the hollow pins 114. In an alternative embodiment, a resistive approach is used to sense input by a user.

FIG. 10 is a cross section view of a bottom panel 130, in accordance with principles of the invention. FIG. 10 is not necessarily drawn to scale. The bottom panel 130 has a top surface 132 and a bottom surface 134. The bottom panel 130 includes larger cylindrical openings 230 in the bottom surface 134, and smaller cylindrical openings 232 in the top surface 132.

The two cylinders 230, 232 are aligned axially. The larger cylinder 230 is formed below the smaller cylinder 232. Each larger cylinder 230 has a diameter that is sized to hold the body of a drive motor 120, and each smaller cylinder 232 has a diameter that is sized to enclose a drive shaft 176 that extends axially from the top of the drive motor 120, while allowing free rotation of each drive shaft 176. The drive shaft 176 of each drive motor 120 extends above the top surface 132 of the bottom panel 130.

Figure 11:
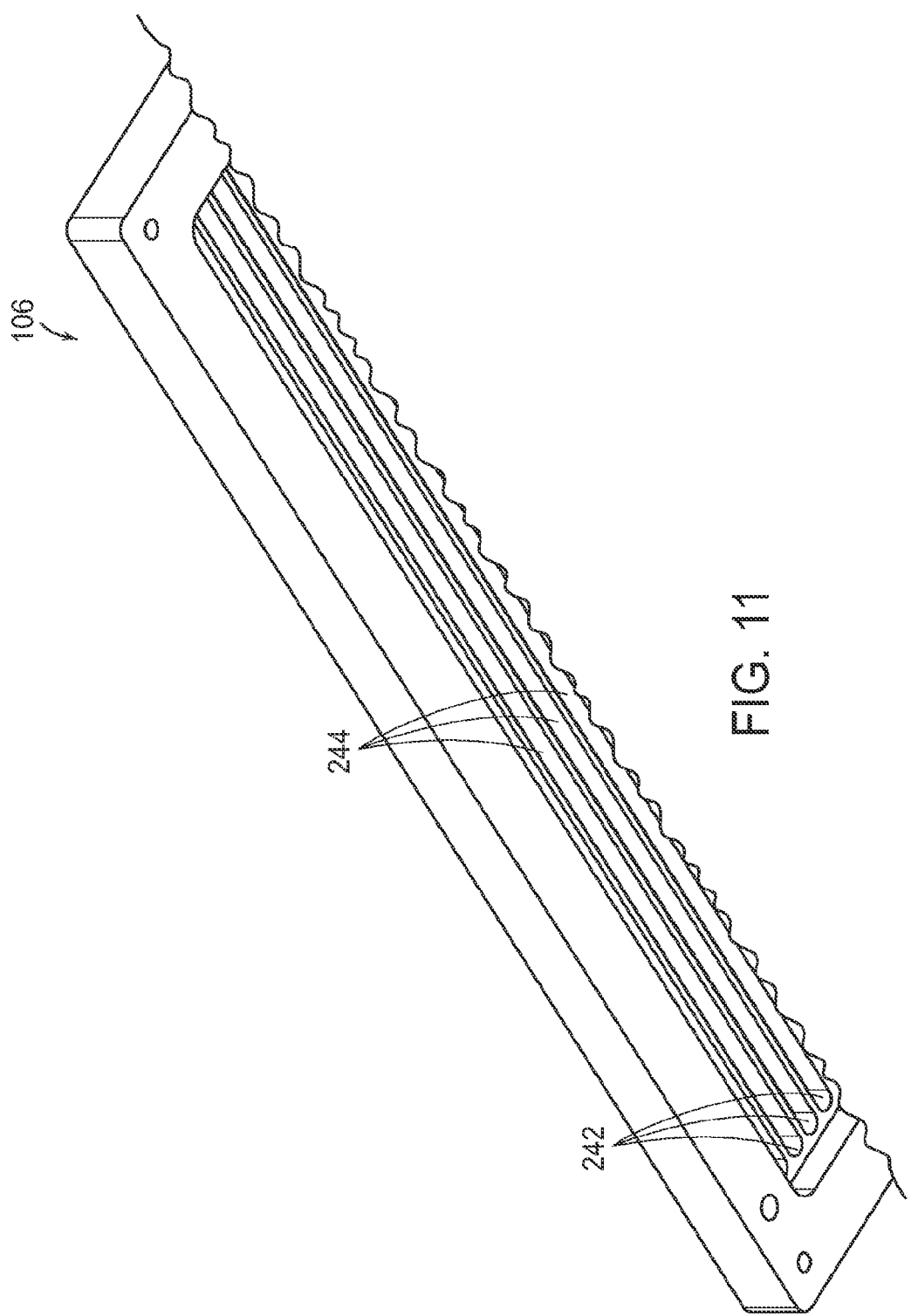
FIG. 11 is an illustration of an isometric partial view of a top panel, according to principles of the invention.

FIG. 11 is an isometric partial view of a top panel 106, according to principles of the invention. FIG. 11 depicts the underside of the top panel 106, showing the slots 242 and parallel planar surfaces 244. The parallel planar surfaces 244 of the slots 242 are engaged by the parallel planar surfaces 186 of the pin nut 144 to serve as an antirotation mechanism to prevent further rotation of the pin nut assembly 154 when the pin nut assembly 154 is raised vertically.

Figure 12B:
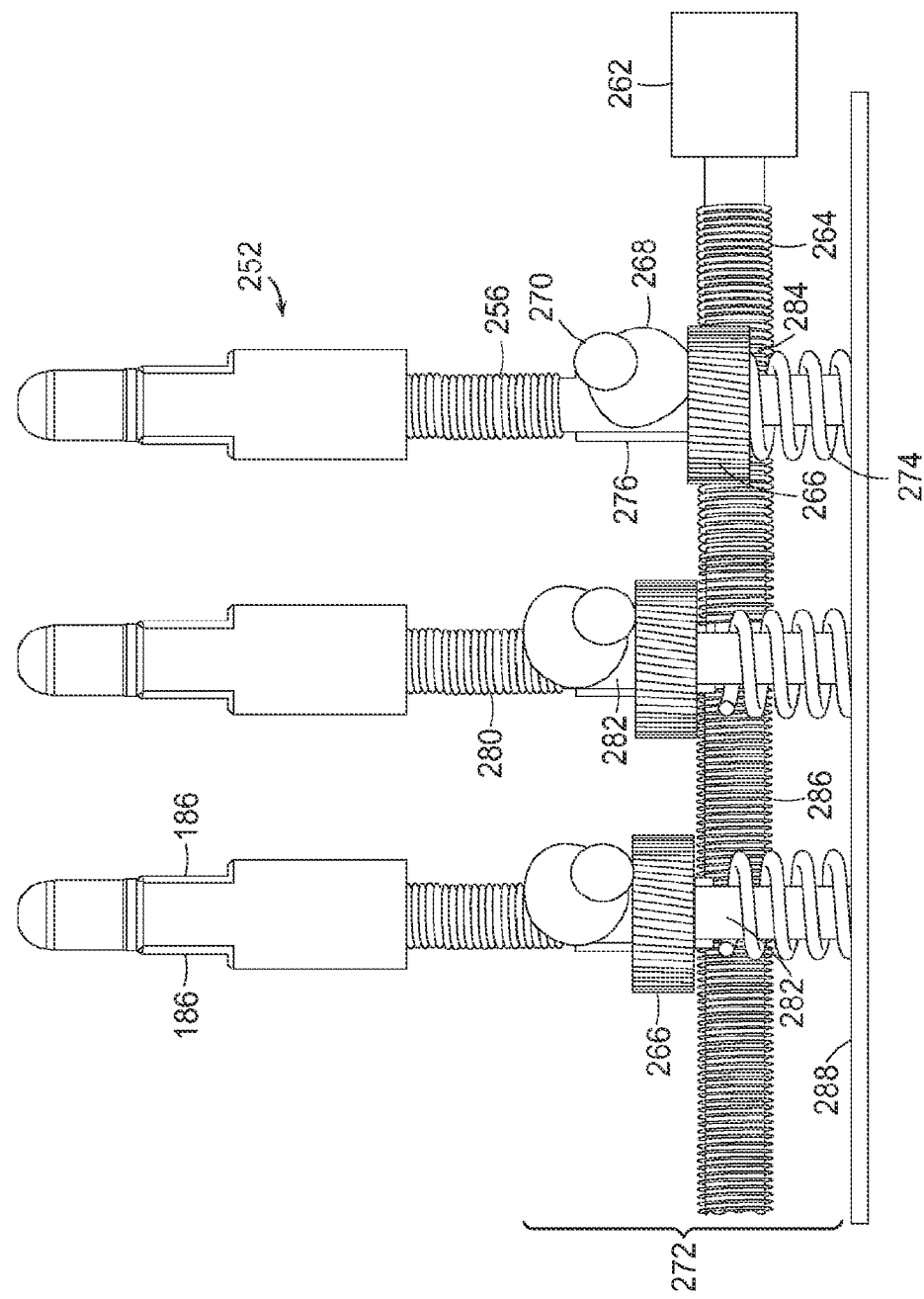
FIG. 12B is an illustration of a side view of the cam and gear assembly of FIG. 12A, in accordance with principles of the invention.

FIG. 12A is an isometric view of a cam and gear assembly 250 including pin nut assemblies 252, in accordance with principles of the invention. FIG. 12B is a side view of the cam and gear assembly 250 of FIG. 12A, in accordance with principles of the invention. The cam and gear assembly 250 includes a pin nut assembly 252, a lead screw 256, a worm gear 264, a pin gear 266, a cam 268, a cam rod 270, and a spring 274. Each worm gear 264 is powered by a row motor 262. In one embodiment, the threads of the worm gear 264 extend the length of the worm gear 264 until close to the row motor 262. Each cam rod 270 is powered by a column motor 278. In one embodiment, the pin nut assembly 252 includes flanges 254. The pin 282 includes an upper threaded portion 280 that provides the threads for the lead screw 256. The pin 282 includes antirotation ridges 276 and is supported by a base 288. The worm gear 264 includes an engaged portion 284 that engages with a pin gear 266, and an unengaged portion 286. The caps 142 of the pin nut assemblies 252 engage with holes 240 in a top panel 106 to function as dots 82 in a dot matrix 28 (not shown in FIGS. 12A and 12B), as described elsewhere herein. In one embodiment, the pin nut assembly 252 is equivalent to the pin nut assembly 154. In various embodiments, the pin nut assembly 252 does not include the flanges 254.

The row motor 262 rotates the worm gear 264, which turns gears 266 which are attached to each pin 282. Each gear 266 attached to each pin 282 has a simple sliding clutch mechanism 272 which is engaged and disengaged by a respective cam 268 mounted on the rod 270 that is rotated by the column motor 278. The clutch mechanism 272 provides for a gear 266 to be depressed when a cam 268 moves to an appropriate position, and a spring 274 causes the gear 266 to return to a neutral (unengaged position) when the cam 268 moves to a neutral position. In one embodiment, the row motors 262 and column motors 278 are stepper motors, allowing precise control of the rotation of the worm gear 264 and cams 268. The column motor 278 engages the clutches 272 of one column at a time. All row motors 262 spin simultaneously, rotating the gears 266 attached to the pins 282 in the column which is currently engaged. The row motors 262 spin in forward or reverse direction depending on which pin nut assembly 252 needs to be raised or lowered, and by an amount commensurate with the height to which the pin nut assembly 252 needs to be raised. The control and interface module 26 provides software control through instructions of the control software of the control and interface module 26 that program the digital microprocessor 46 to provide motor drive signals 34 directed to the row motors 262 and column motors 278. Once one column of pin nut assemblies 252 is set, the next column engages and the process repeats. The cam and gear approach described herein has the advantage that the motors 262, 278 are powerful and there are only (Row plus Column) motors 262, 278. Another advantage is that the pitch of the pins 282 can be made arbitrarily small. Also, it takes only a few seconds to refresh the entire display representation 30 presented on the dot matrix 28.

In one embodiment, the tactile graphic display 24 has the ability to control and vary the height of the pin nut assembly 252; that is, the height of the dots 82 on the dot matrix 28. This effect is achieved by controlling the rotations of the motor drive shaft 176 via a software approach and also with an electrical and/or optical feedback mechanism that measures the rotation of the drive shaft 176. The control and interface module 26 provides software control through instructions of the control software that program the digital microprocessor 46 to provide motor drive signals 34 directed to the drive motors 120 to control the height of the pin nut assemblies 154. To move the pin nut assemblies 154 higher, more rotations are made. In a further embodiment, there is the ability to dynamically move or pulsate each pin nut assembly 154 to convey additional information to the user.

For an embodiment of the cam and gear assembly 250, a similar effect of controlling and varying the height of a pin nut assembly 252 is accomplished by controlling the rotations of the worm gear 264 by use of motor drive signals 34 directed to the respective row motor 262. The control and interface module 26 provides software control through instructions of the control software that program the digital microprocessor 46 to provide motor drive signals 34 directed to the row motors 262 to control the height of the respective pin nut assemblies 154.

Figure 13:
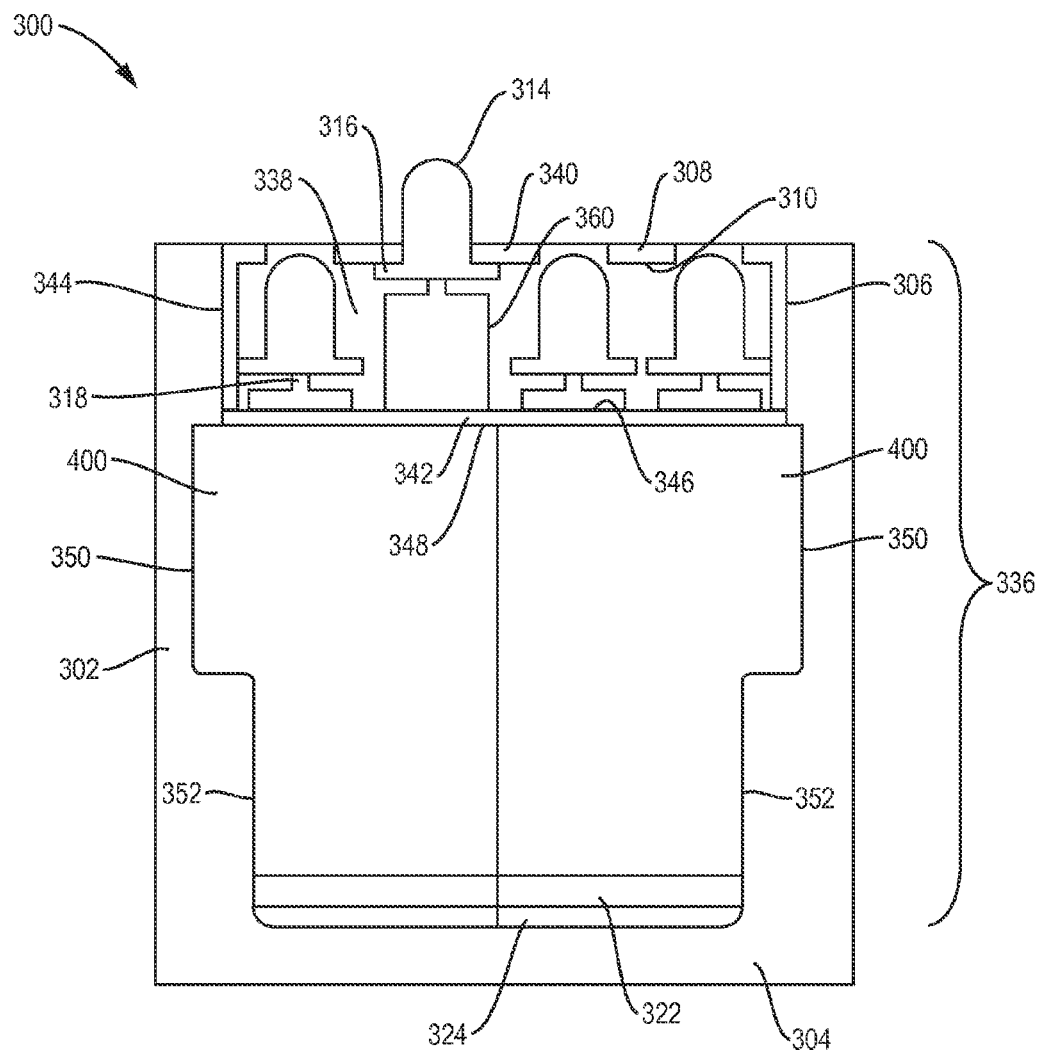
FIG. 13 is a side view of a tactile display case for a tactile graphic display, according to principles of the invention.

FIG. 13 is a side view of a tactile display case 300 for a tactile graphic display 22, according to principles of the invention. In the embodiment of FIG. 13, frame assemblies 400 including actuators are provided in place of a drive motor 120. The display case 300 of FIG. 13 is formed from side portions 302, a bottom portion 304, and a top panel 306. In one embodiment, the side portions 302 and the bottom portion 304 may be unitary part. FIG. 13 also depicts hollow pins 314, flanges 316, collars 360, drive shafts 318, electrical contacts 322, and a printed circuit board 324. In one embodiment, the flanges 316 are incorporated into the hollow pins 314 and the collars 360 may be incorporated into the drive shafts 318. The top panel 306 contains the hollow pins 314 including the flanges 316. The printed circuit board 324 may be mounted to the display case 300. For example, the printed circuit board 324 may be mounted to the bottom portion 304 of the display case 300. In an alternative embodiment, the printed circuit board may be mounted to a side of the frame assemblies, and the frame assemblies may be mounted to a bottom of the display case.

Figure 14:
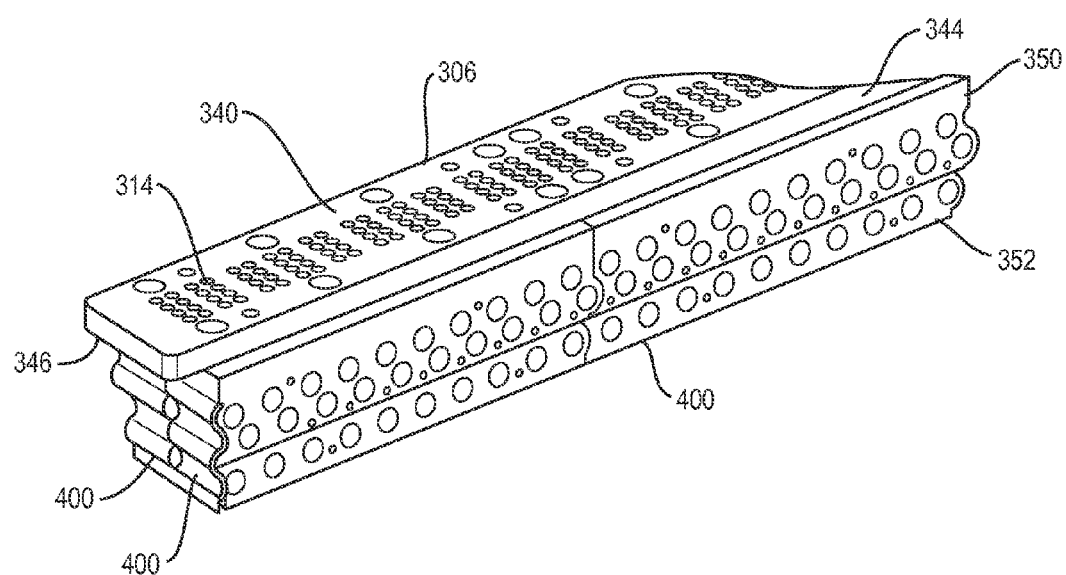
FIG. 14 is an illustration of a perspective view of four frame assemblies attached to a top panel.

In one embodiment, the top panel 306 includes an upper portion 340, a lower portion 342, and side portions 344. The top panel may include a front portion (not shown) and a rear portion 346 (FIG. 14). The upper portion 340, lower portion 342, side portions 344, front portion, and rear portion 346 define a rectangular cube including a hollow area 338 therein. The upper portion 340 includes a top surface 308 and a bottom surface 310. The lower portion 342 includes a top surface 308 and a bottom surface 348. The display assembly 336 generally includes the dot matrix 28, dots 82, top panel 306, and the frame assemblies 400. For the example shown in FIG. 13, the display assembly 336 includes the frame assemblies 400, the top panel 306, the hollow pins 314, the flanges 316, the collars 360, and the drive shafts 318. In the example depicted in FIG. 13, two (2) frame assemblies 400 are shown, which is not intended to be limiting of the number of frame assemblies 400 in various embodiments of the invention. For example, a single frame assembly or more than two (2) frame assemblies may be provided.

FIG. 14 is an illustration of a perspective view of four (4) frame assemblies 400 attached to a top panel 306. Although four (4) frame assemblies 400 are shown and described with respect to FIG. 14, this is not intended to be limiting of the number of frame assemblies in various embodiments of the invention. For example, less than or more than four (4) frame assemblies may be provided. In one embodiment, one side of a frame assembly 400 may be stepped such that a first portion 350 of the frame assembly 400 is a first width and a second portion 352 is a second width. In the embodiment shown, the frame assemblies 400 may generally extend perpendicular to both the hollow actuator chambers 416 (see FIG. 15) and the hollow shaft chambers 422 (see FIG. 15).

Figure 15:
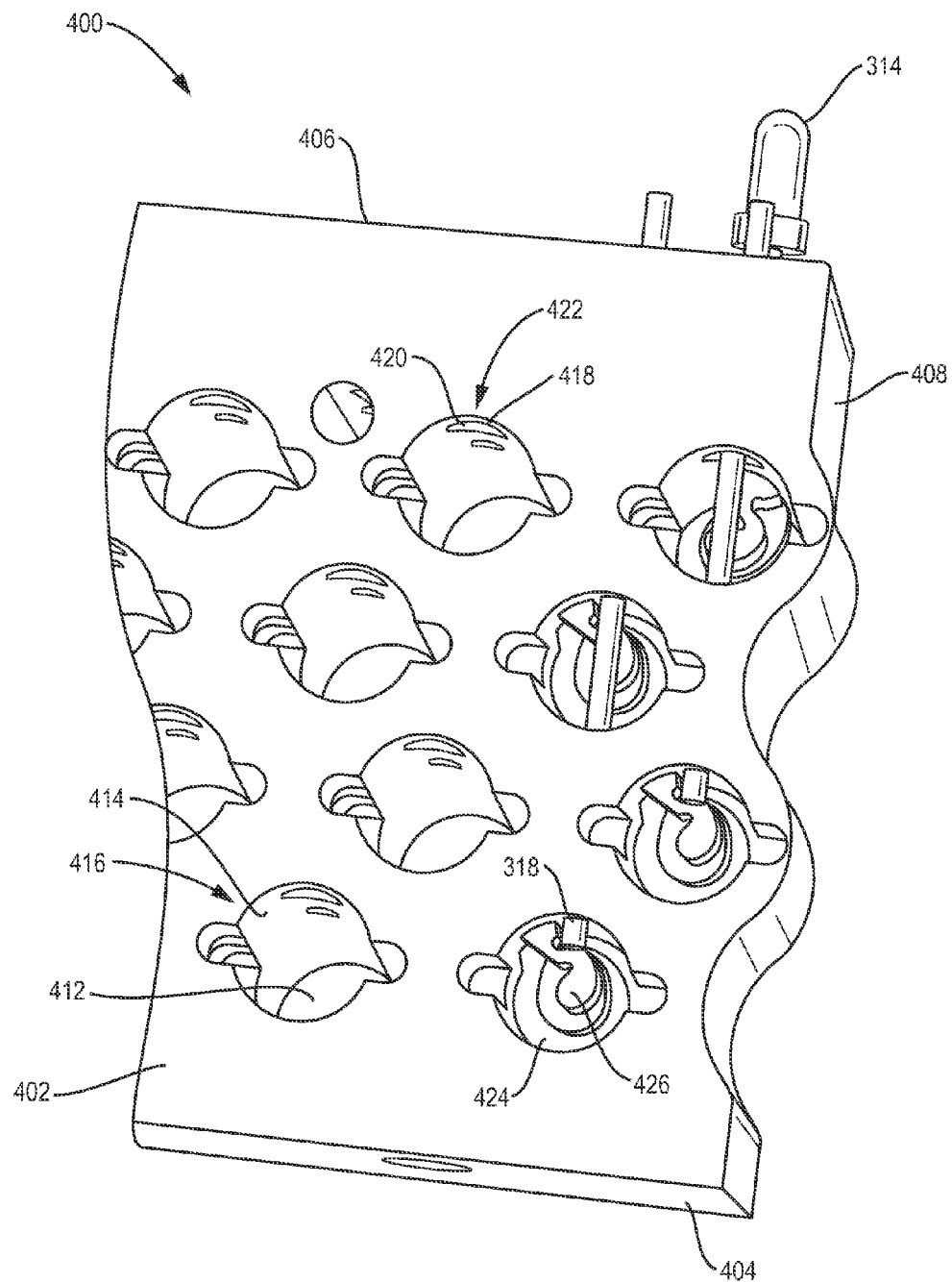
FIG. 15 is an illustration of a perspective view of a frame assembly, according to principles of the invention.

FIG. 15 is an illustration of a perspective view of a frame assembly 400, according to principles of the invention. The frame assembly 400 includes at least one side surface 402, a bottom surface 404 connected to the side surface, and a top surface 406 connected to the side surface. The frame assembly 400 further includes a front surface 408 and a back surface (not shown). The front surface 408 and the back surface may have a wave configuration. The front surface 408 of a first frame assembly 400 may be a mirror image or near mirror image of the back surface of a second frame assembly 400 such that the waved surfaces of each may directly abut one another.

The side surface 402 includes side surface holes 412. Each side surface hole includes a sidewall 414 extending inwardly from the side surface 402 thereby defining a hollow actuator chamber 416. In an embodiment, the hollow actuator chamber 416 extends from the side surface 402 through the frame assembly 400 to a second side surface 402. In an alternative embodiment, the hollow actuator chamber 416 extends from one side surface 402 inwardly but not through a second side surface 402.

The top surface 406 includes top surface holes 418. Each top surface hole includes a sidewall 420 extending inwardly from the top surface 406 thereby defining a hollow shaft chamber 422. The hollow shaft chambers 422 extend through the frame assembly 400 perpendicular to the hollow actuator chambers 416 and through the hollow actuator chambers. The hollow actuator chambers 416 extend through the frame assembly 400 perpendicular to the hollow shaft chambers 422 and extend through the hollow shaft chambers.

The frame assemblies 400 include actuators 424 within the hollow actuator chambers 416. The actuators 424 are electric actuators having a cylindrical shape. The frame assemblies include drive shafts 318 within the hollow shaft chambers 422. Cams 426 operably connect the actuators 424 to the drive shafts 318. The pins 314 are connected to the drive shafts. In an embodiment, the hollow pins 314 are connected to the drive shafts via a spring 490 (see FIG. 23).

Figure 16:
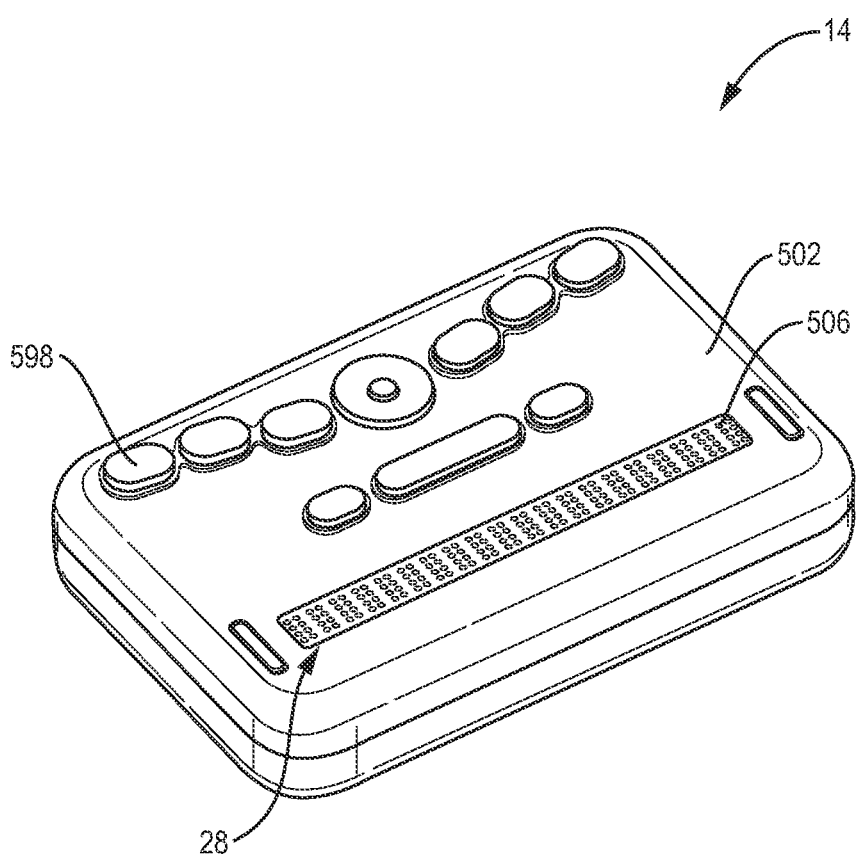
FIG. 16 is an illustration of a perspective view of a tactile graphic display according to principles of the invention.

FIG. 16 is an illustration of a perspective view of a tactile graphic display 14 according to principles of the invention. The tactile graphic display 14 may include a case 502 housing a control and interface module (including an external interface (e.g., USB, Bluetooth), a drive module, a motor or actuator power supply, a touch module, and a button module) and the dot matrix. The case may further comprise a set of buttons 598 providing input to the button input module. For example, reset, zoom, panning, and rotation buttons may provide input to the button input module. A top of the tactile graphic display 14 may include an opening to receive a top panel 506. A top surface of the top panel 506 may be flush with a surface of the tactile graphic display 14. Although a four (4) by forty (40) dot matrix 28 is shown and described with respect to FIG. 16, this is not intended to be limiting of the size and configuration of various embodiments of the invention. For example, a larger (such as 40×60 pins with a letter-size device) or smaller dot matrix may be provided. In an embodiment, the pins may have a 4 mm pin pitch (distance between centers of adjacent pins). However, this is not intended to be limiting and other pin pitches are considered to be within the scope of the present invention.

Figure 17:
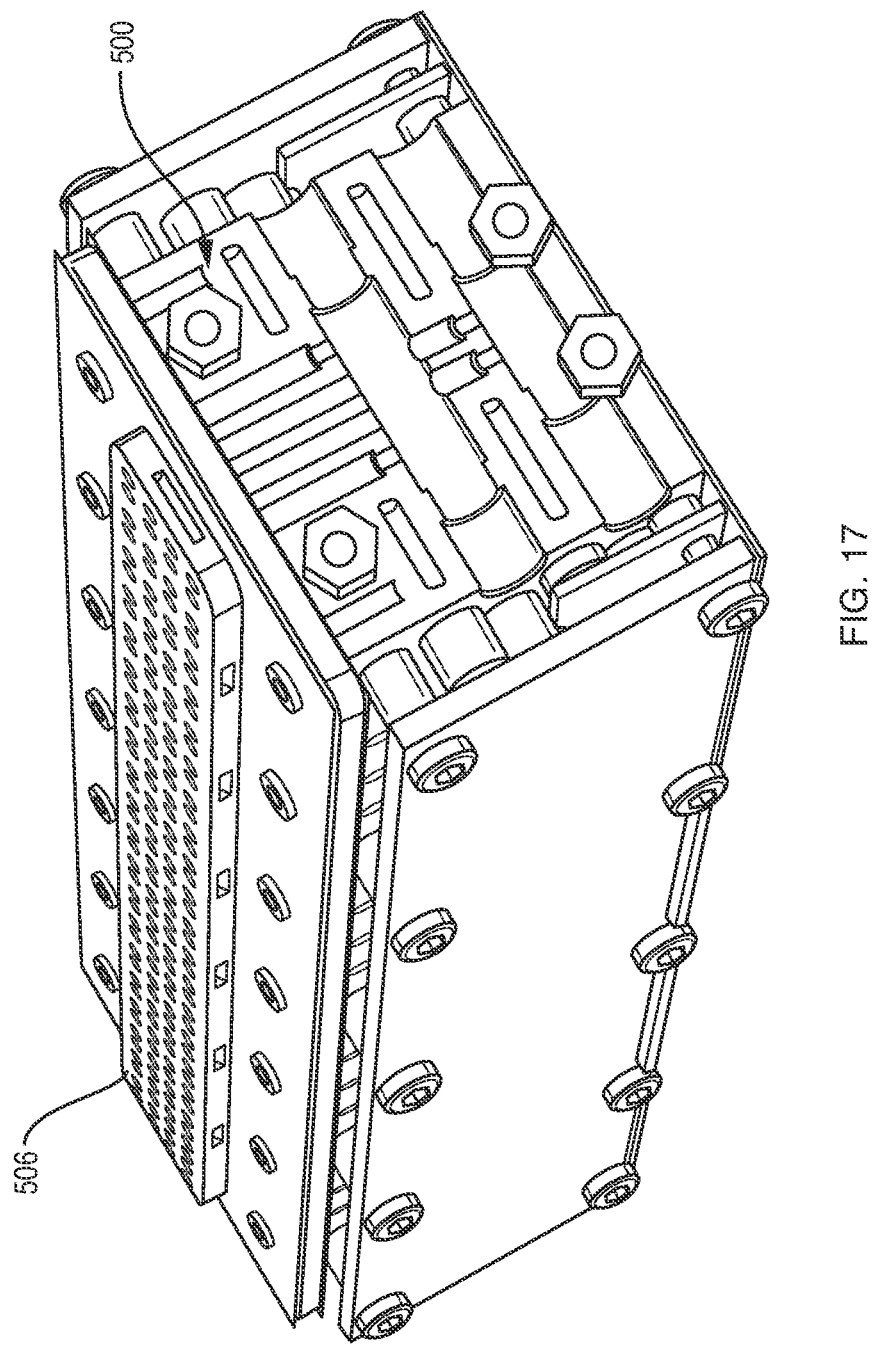
FIG. 17 is an illustration of a perspective view of a series of frame assemblies according to principles of the invention.
Figure 19:
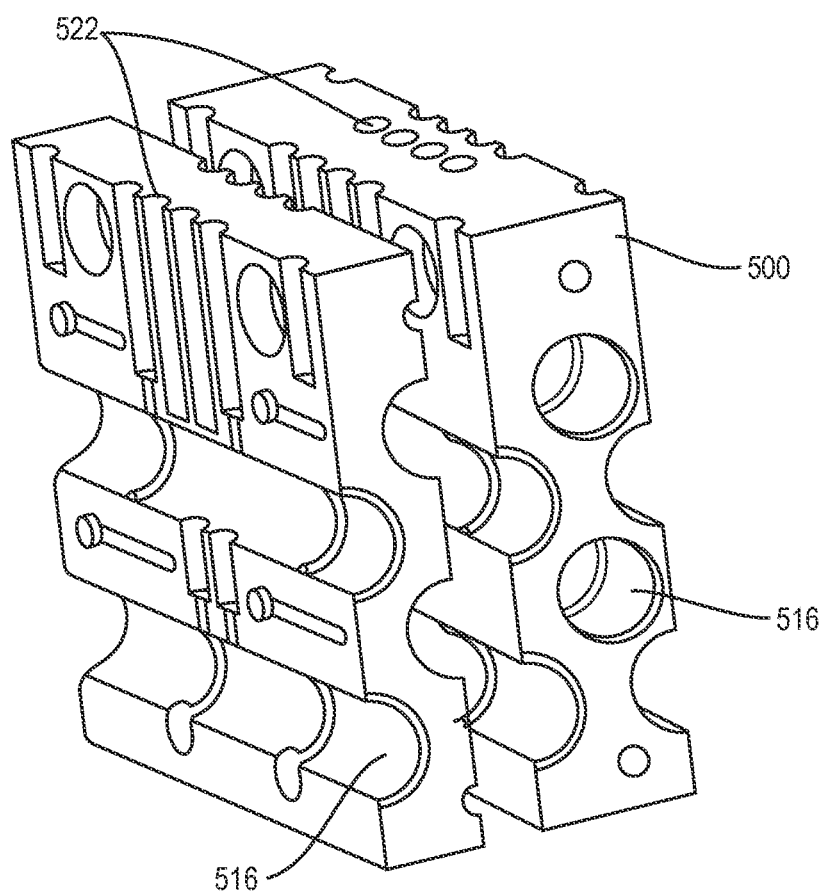
FIG. 19 is an illustration of a perspective view of three of the frame assemblies of FIG. 17.

FIG. 17 is an illustration of a perspective view of forty-one (41) frame assemblies 500 according to principles of the invention. Although forty-one (41) frame assemblies 500 are shown and described with respect to FIG. 17, this is not intended to be limiting of the number of frame assemblies in various embodiments of the invention. For example, less than or more than forty-one (41) frame assemblies may be provided. Turning now to FIG. 19, which depicts only three (3) frame assemblies 500 for the sake of explanation, the frame assemblies 500 may extend parallel to the hollow actuator chambers 516. The frame assemblies 500 may include alternating mirror image or near mirror image assemblies. For example, in the embodiment shown in FIG. 19, the assemblies are near mirror image assemblies 500 that may include partial or half actuator chambers 516 and partial or half shaft chambers 522 such that when a pair of near mirror image frame assemblies is placed next to one another, complete or whole actuator chambers 516 and complete or whole shaft chambers 522 may be formed. In the embodiment shown in FIG. 19, the assemblies 500 have varying sizes/configurations and may also result in staggered actuator chambers 516 when assembled. Various modifications of the assemblies are contemplated and considered to be within the scope of the present invention.

Figure 18:
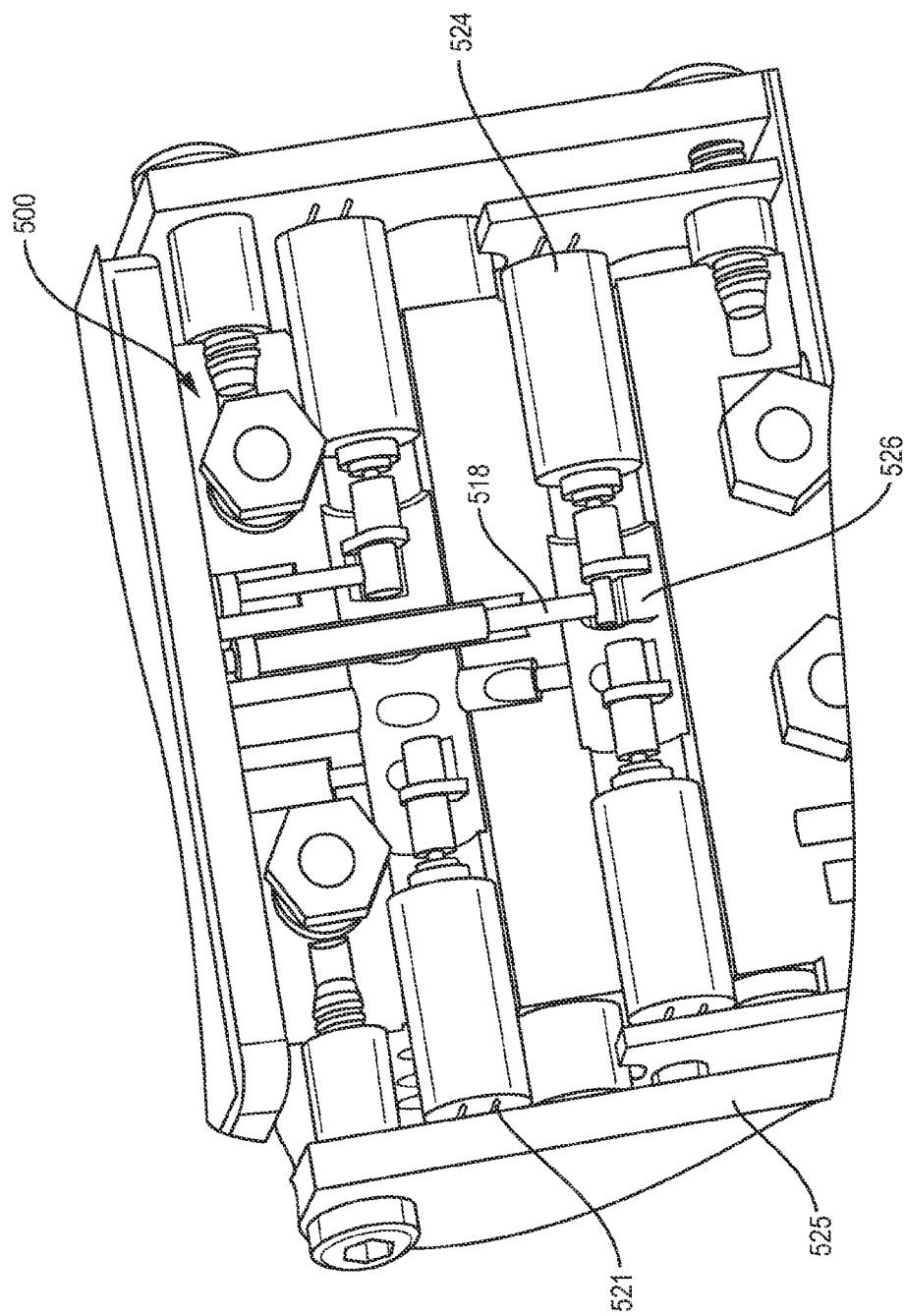
FIG. 18 is an illustration of a perspective view of the series of frame assemblies of FIG. 17 with an end frame assembly not shown.

Turning back to FIGS. 17 and 18, the frame assemblies 500 include actuators 524 within the hollow actuator chambers 516. The actuators 524 are electric actuators having a cylindrical shape and spring contacts 521 to electrically connect with printed circuit boards 525, which may be arranged vertically next to the frame assemblies 500. The frame assemblies 500 include drive shafts 518 within the hollow shaft chambers 522. Cams 526 operably connect the actuators 524 to the drive shafts 518. Pins may be connected to the drive shafts 518.

Figure 20:
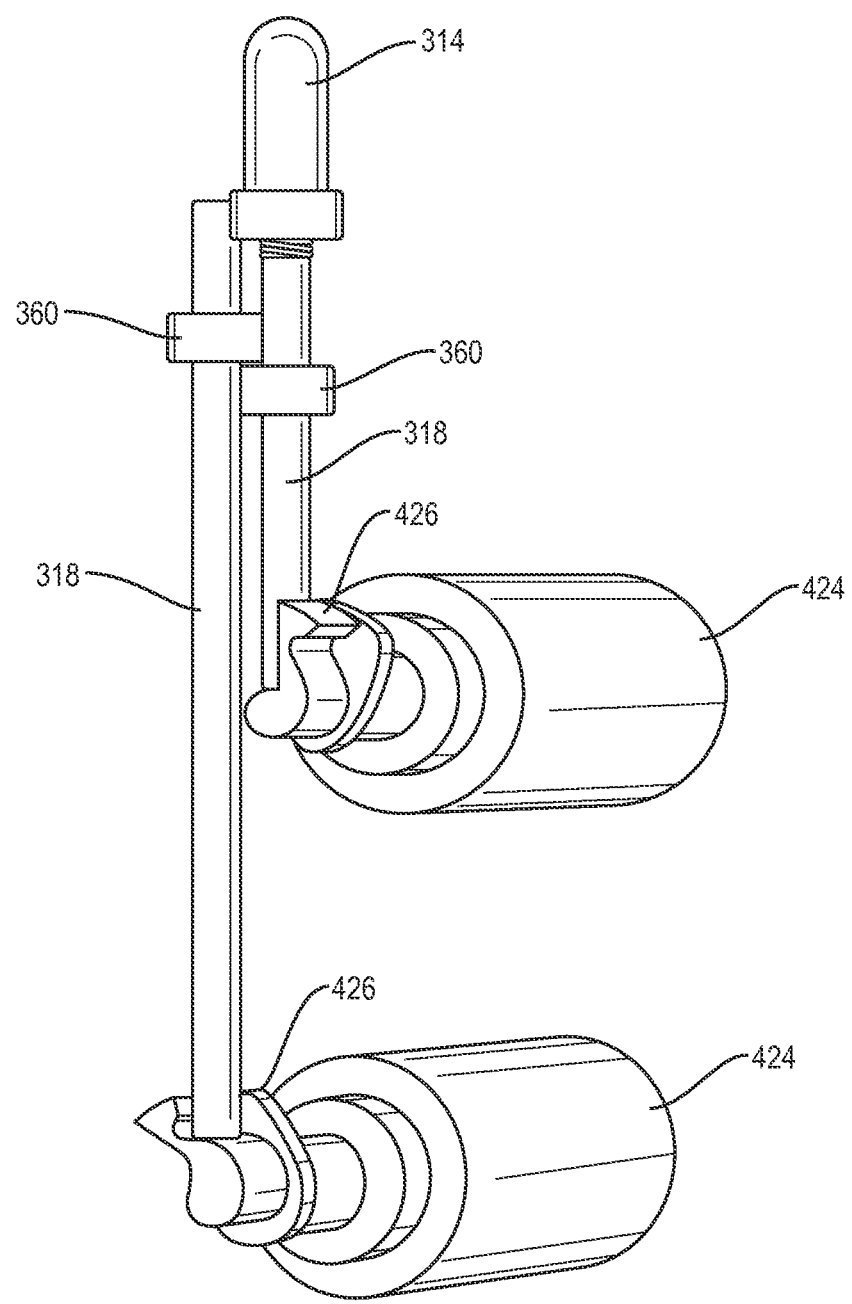
FIG. 20 is an illustration of a perspective view of two actuators operably connected to two cams, according to principles of the invention.

FIG. 20 is an illustration of a perspective view of two actuators 424 operably connected to two cams 426, according to principles of the invention. The cams 426 are shown engaging two drive shafts 318. In FIG. 20, one drive shaft 318 is depicted as being connected to a hollow pin 314, while the other drive shaft 318 is shown without a hollow pin.

Figure 21:
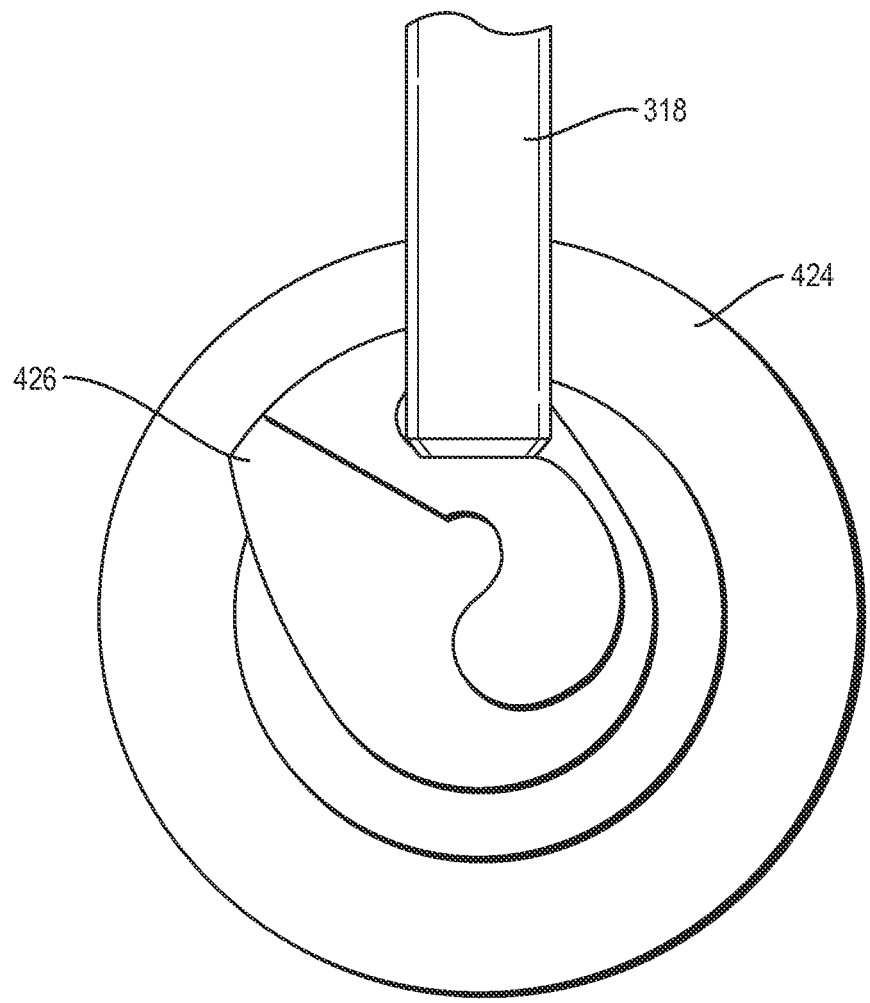
FIG. 21 is an illustration of a front view of a cam operably connected to an actuator, according to principles of the invention.

FIG. 21 is an illustration of a front view of a cam 426 operably connected to an actuator 424, according to principles of the invention. The cam 426 is shown engaging drive shaft 318. In an embodiment, the cam 426 and drive shaft 318 constitute a rotating cam-translating follower configuration, with the drive shaft 318 being a flat-faced follower. In an alternative embodiment, the cam and shaft may constitute an alternative configuration, such as with the drive shaft being a knife-edge follower, a roller follower, an oblique flat-faced follower, or a spherical-faced follower. The cam 426 is shown in FIG. 21 in an up position.

Figure 22:
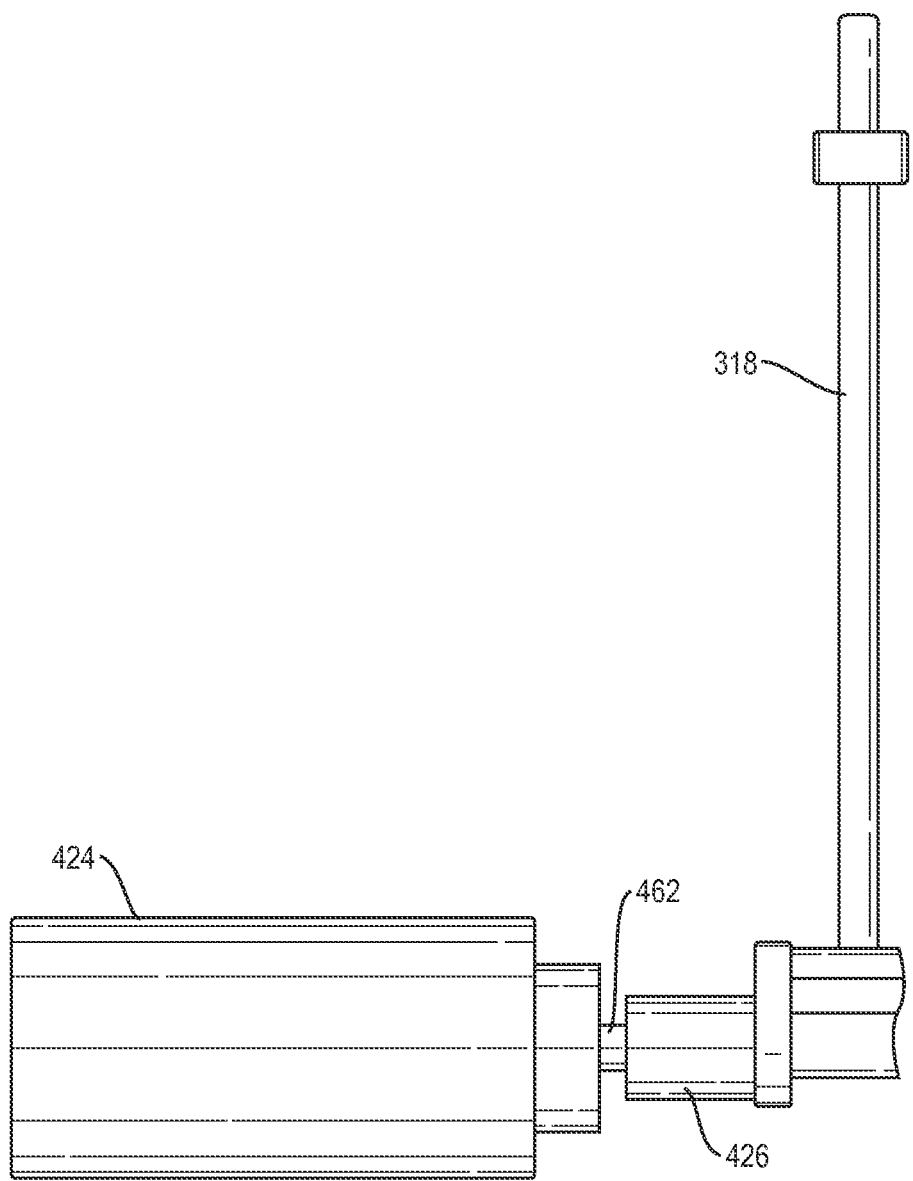
FIG. 22 is an illustration of a side view of the cam, actuator, and drive shaft of FIG. 21.

FIG. 22 is an illustration of a side view of the cam 426, actuator 424, and drive shaft 318 of FIG. 21. The actuator 424 is connected to the cam 426 via an actuator shaft 462.

Figure 23:
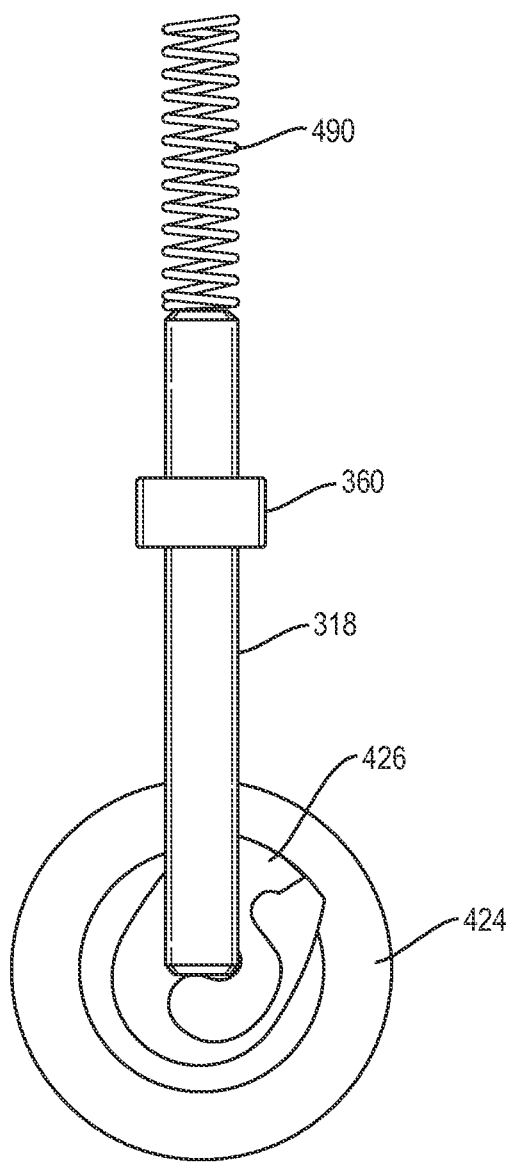
FIG. 23 is an illustration of a front view of a cam operably connected to an actuator, according to principles of the invention.

FIG. 23 is an illustration of a front view of a cam 426 operably connected to an actuator 424, according to principles of the invention. In FIG. 23, the cam 426 is shown in a down position.

In operation, a first voltage may be supplied to an actuator 424 to rotate a cam 426 about an axis of the actuator in a first direction from a down position of the cam (see FIG. 23) to an up position of the cam (see FIG. 21). Such rotation may extend a corresponding drive shaft 318 upwardly causing a corresponding pin cap 142 to protrude a maximum distance from the top surface 308 of the frame assembly 400 and thereby a maximum surface from a top surface 308 of the upper portion 340 of the top panel 306. The flange 316 may contact the bottom surface 310 of the upper portion 340 thereby preventing further upward movement of the pin cap 142.

In an embodiment, the rotation of the cam may be substantially 300 degrees. In an embodiment, the rotation may be between 180 and 350 degrees. In another embodiment, the rotation may be between 270 and 330 degrees. In another embodiment, the rotation may be between 290 and 310 degrees. A second voltage may be supplied to the actuator 424 to rotate the cam 426 about the axis of the actuator in a second direction opposite to the first direction to the down position of the cam 426 thereby retracting the drive shaft downwardly causing the pin cap 142 to retract from the maximum distance from the top surface of the frame assembly 400 (and the top surface of the display case 300). The collar 360 may be larger in diameter than the shaft 318 and may serve as a guide and a smaller contact surface for the shaft within the hollow shaft chamber. In one embodiment, a cam may be rotated only a portion of a possible rotation. Accordingly, a corresponding drive shaft may be raised (or retracted) partially, thereby enabling pins to protrude a partial distance from a top surface of a top panel. This allows pins to protrude different distances relative to one another such as may be desirable with, e.g., a topographical map. In another embodiment, a cam may be oscillated such that a corresponding shaft and pin may oscillate up and down so as to provide additional information to a user (such would be provided by, e.g., different colored pixels of a graphic display). Alternatively, one or more vibration motors or elements may be provided in addition to actuators to oscillate pins. As noted above, elements from an embodiment may be combined with elements of another such that oscillation (or any other feature) may be provided with other embodiments. For example, oscillation may be applied to one or more screws in embodiments which include such screws.

While the invention has been shown and described with reference to specific preferred embodiments, it should be understood by those skilled in the art that various changes in form and detail may be made therein.

For example, in one embodiment, an actuator may be a motor. As another example, embodiments of the invention are not required to be implemented in terms of a graphic device 22 and a control and interface module 26. For example, functions of the graphic device 22 and control and interface module 26 are implemented in a single device. Alternately, functions of the graphic device 22 and control and interface module 26 are implemented through three or more various devices or packaged as other types of physical devices. As another example, a speech output function may be provided to augment output to a user.

As yet another example, in alternate implementations, all or part of the software functions described herein are implemented in hardware, for example, in a programmable gate array (PGA), programmable logic device (PLD), application specific integrated circuit (ASIC), or other suitable IC chip. Portions of the software functions may be implemented by plural IC chips in communication with each other.

What is claimed is:

1. One or more frame assemblies of an apparatus for a graphic tactile display, the one or more frame assemblies comprising:

a plurality of hollow actuator chambers;
a plurality of hollow shaft chambers, the hollow shaft chambers extending perpendicular to the hollow actuator chambers;
a plurality of actuators received within the plurality of hollow actuator chambers;
a plurality of drive shafts received with the hollow shaft chambers; and
a plurality of cams operably connecting the actuators to the drive shafts;
wherein each actuator operably rotates each cam about an axis of the actuator in a first direction from a down position of the cam to an up position thereby extending each drive shaft upwardly;
wherein each actuator operably rotates each cam about the axis of the actuator in a second direction opposite to the first direction to the down position of the cam thereby retracting each drive shaft downwardly; and
wherein each of the plurality of cams has a profile which maintains each drive shaft in its up position or down position without power from each actuator.

2. The one or more frame assemblies of claim 1, further comprising a plurality of pins operably connected to ends of the drive shafts opposite the plurality of cams,
wherein when each drive shaft is extended upwardly, each pin protrudes a maximum distance from a top surface of the one or more frame assemblies, and
wherein when each drive shaft is retracted downwardly, each pin retracts from the maximum distance from the top surface of the frame assembly.

3. The one or more frame assemblies of claim 1, wherein a rotation between the down position of the cam and the up position of the cam comprises a substantially 300 degree rotation.

4. The one or more frame assemblies of claim 1, wherein the actuators include electrical contacts to receive actuator drive signals.

5. The one or more frame assemblies of 2, wherein the pins are operably connected to the drive shafts via a spring.

6. The one or more frame assemblies of claim 1, wherein the drive shafts each include a collar.

7. The one or more frame assemblies of claim 1, further comprising a top panel housing said pins, wherein said top panel includes an upper portion including upper portion holes, wherein each of the pins include a flange larger in diameter than the upper portion holes.

8. The one or more frame assemblies of claim 1, wherein the hollow actuator chambers are cylindrical.

9. The one or more frame assemblies of claim 1, wherein the hollow shaft chambers are cylindrical.

10. An apparatus for a graphic tactile display configured to communicate with a graphic device providing graphic output signals for a display representation, the apparatus comprising:
a control and interface module having an external interface to receive the graphic output signals; a drive module for producing actuator drive signals; and a control processor for processing the graphic output signals to produce the actuator drive signals; and
a display assembly comprising a dot matrix, a top panel, and one or more frame assemblies comprising:
a plurality of hollow actuator chambers;
a plurality of hollow shaft chambers, the hollow shaft chambers extending perpendicular to the hollow actuator chambers;
a plurality of actuators received within the plurality of hollow actuator chambers;
a plurality of drive shafts received with the hollow shaft chambers;
a plurality of cams operably connecting the actuators to the drive shafts; and
a plurality of pins operably connected to ends of the drive shafts opposite the plurality of cams,
wherein each actuator operably rotates each cam about an axis of the actuator in a first direction from a down position of the cam to an up position thereby extending each drive shaft upwardly causing each pin to protrude a maximum distance from a top surface of the one or more frame assemblies, and
wherein each actuator operably rotates each cam about the axis of the actuator in a second direction opposite to the first direction to the down position of the cam thereby retracting each drive shaft downwardly causing each pin cap to retract from the maximum distance from the top surface of the one or more frame assemblies;
wherein each of the plurality of cams has a profile which maintains each drive shaft in its up position or down position without power from each actuator
the display assembly receiving the actuator drive signals, the plurality of actuators in contact with the control and interface module; the top surface of the one or more frame assemblies providing a plurality of openings, the openings determining a size and shape for the dot matrix, wherein each pin corresponds in position to a respective opening, each opening sized to enable each respective pin free motion up and down for raising the pin above a top surface of the one or more frame assemblies to generate the display representation based on the graphic output signals.

11. The apparatus of claim 10, wherein a rotation between the down position of the cam and the up position of the cam comprises a substantially 300 degree rotation.

12. The apparatus of claim 10, wherein the actuators include electrical contacts to receive actuator drive signals.

13. The apparatus of claim 10, wherein the pins are operably connected to the drive shafts via a spring.

14. The apparatus of claim 10, wherein the drive shafts each include a collar.

15. The apparatus of claim 10, wherein the display assembly further comprises a top panel, the panel housing the plurality of pins and providing a plurality of pin openings corresponding to the plurality of openings of the top surface of the one or more frame assemblies, wherein said top panel includes an upper portion including upper portion holes, wherein each of the pins include a flange larger in diameter than the upper portion holes.

16. The apparatus of claim 10, wherein the hollow actuator chambers are cylindrical.

17. The apparatus of claim 10, wherein the hollow shaft chambers are cylindrical.

* * * * *

UNITED STATES PATENT AND TRADEMARK OFFICE
CERTIFICATE OF CORRECTION

| | |
|---|---|
| PATENT NO. | : 9,812,033 B2 |
| APPLICATION NO. | : 14/850393 |
| DATED | : November 7, 2017 |
| INVENTOR(S) | : Chari et al. |

Page 1 of 1

It is certified that error appears in the above-identified patent and that said Letters Patent is hereby corrected as shown below:

In the Specification

In Column 7, Line 15, delete "side portions," and insert -- side portions --, therefor.

In Column 7, Line 17, delete "portions, 102" and insert -- portions 102 --, therefor.

Signed and Sealed this
Twenty-seventh Day of February, 2018

Andrei Iancu
*Director of the United States Patent and Trademark Office*